US012022276B2

(12) United States Patent
Thiergart et al.

(10) Patent No.: US 12,022,276 B2
(45) Date of Patent: Jun. 25, 2024

(54) APPARATUS, METHOD OR COMPUTER PROGRAM FOR PROCESSING A SOUND FIELD REPRESENTATION IN A SPATIAL TRANSFORM DOMAIN

(71) Applicant: Fraunhofer-Gesellschaft zur Förderung der angewandten Forschung e.V., Munich (DE)

(72) Inventors: Oliver Thiergart, Erlangen (DE); Alexander Niederleitner, Erlangen (DE); Emanuel Habets, Erlangen (DE); Moritz Wild, Erlangen (DE); Axel Plinge, Erlangen (DE); Achim Kuntz, Erlangen (DE); Alexandre Bouthéon, Erlangen (DE); Dirk Mahne, Erlangen (DE); Fabian Küch, Erlangen (DE)

(73) Assignee: Fraunhofer-Gesellschaft zur Förderung der angewandten Forschung e.V., Munich (DE)

( * ) Notice: Subject to any disclaimer, the term of this patent is extended or adjusted under 35 U.S.C. 154(b) by 150 days.

(21) Appl. No.: 17/583,760

(22) Filed: Jan. 25, 2022

(65) Prior Publication Data

US 2022/0150657 A1 May 12, 2022

Related U.S. Application Data

(63) Continuation of application No. PCT/EP2020/071120, filed on Jul. 27, 2020, which is (Continued)

(51) Int. Cl.

*H04S 7/00* (2006.01)
*H04R 5/04* (2006.01)

(52) U.S. Cl.

CPC ............... *H04S 7/302* (2013.01); *H04R 5/04* (2013.01); *H04S 2400/03* (2013.01); *H04S 2420/01* (2013.01)

(58) Field of Classification Search

CPC ............. H04S 7/304; H04S 7/302–303; H04S 2420/01

(Continued)

(56) References Cited

U.S. PATENT DOCUMENTS 7,428,310 B2 * 9/2008 Park ........................ H04S 7/301 381/104
9,536,531 B2 * 1/2017 Morrell .................. H04H 20/89

(Continued)

FOREIGN PATENT DOCUMENTS

CN 105409242 A 3/2016
CN 105723743 A 6/2016

(Continued)

OTHER PUBLICATIONS

O.I. Starukhina, "Office Action for RU Application No. 2022104955", dated Sep. 14, 2022, Rospatent, Russia.

(Continued)

*Primary Examiner* — Disler Paul
(74) *Attorney, Agent, or Firm* — NKL LAW; Jae Youn Kim

(57) ABSTRACT

Apparatus for processing a sound field representation related to a defined reference point or defined listening orientation for the sound field representation including: a sound field processor for processing the sound field representation using a deviation of a target listening position from the defined reference point or a target listening orientation from the defined listening orientation to obtain a processed sound field description which, when rendered, provides an impression of the sound field representation at the target listening (Continued)

position being different from the defined reference point or for the target listening orientation being different from the defined listening orientation, or for processing the sound field representation using a spatial filter to obtain the processed sound field description which, when rendered, provides an impression of a spatially filtered sound field description, the sound field processor being configured to process the sound field representation to apply the deviation or the spatial filter in a spatial transform domain with an associated forward transform rule and backward transform rule.

29 Claims, 18 Drawing Sheets

Related U.S. Application Data a continuation of application No. PCT/EP2019/070373, filed on Jul. 29, 2019.

(58) Field of Classification Search
USPC ............................................ 381/309–310, 74
See application file for complete search history.

(56) References Cited

U.S. PATENT DOCUMENTS

| | | | | |
|---|---|---|---|---|
| 10,582,329 | B2 * | 3/2020 | Magariyachi | H04S 7/304 |
| 10,835,809 | B2 * | 11/2020 | Contreras | A63F 13/212 |
| 10,939,039 | B2 * | 3/2021 | Lee | H04N 21/845 |
| 10,979,846 | B2 * | 4/2021 | Eronen | H04S 7/306 |
| 11,330,388 | B2 * | 5/2022 | Benattar | H04S 7/303 |
| 2014/0093108 | A1 | 4/2014 | Watanabe | |
| 2014/0314256 | A1 | 10/2014 | Fincham et al. | |
| 2014/0321680 | A1 | 10/2014 | Takahashi et al. | |
| 2015/0189455 | A1 | 7/2015 | Donaldson | |
| 2016/0269848 | A1 | 9/2016 | Mitsufuji et al. | |
| 2016/0337777 | A1 | 11/2016 | Tsuji et al. | |
| 2018/0068664 | A1 | 3/2018 | Seo et al. | |
| 2019/0007780 | A1 | 1/2019 | Sheaffer et al. | |
| 2019/0116444 | A1 | 4/2019 | Benattar | |
| 2019/0215638 | A1 | 7/2019 | Stein et al. | |
| 2019/0253826 | A1 | 8/2019 | Grosche et al. | |
| 2021/0250717 | A1 * | 8/2021 | Laitinen | H04S 3/008 |

FOREIGN PATENT DOCUMENTS

| | | | |
|---|---|---|---|
| CN | 109891502 | A | 6/2019 |
| CN | 109891503 | A | 6/2019 |
| JP | 2014-072871 | A | 4/2014 |
| RU | 2586842 | C2 | 6/2016 |
| RU | 2602346 | C2 | 11/2016 |
| RU | 2609102 | C2 | 1/2017 |
| WO | 2011/073210 | A1 | 6/2011 |
| WO | 2013/079663 | A2 | 6/2013 |
| WO | 2013-105413 | A1 | 7/2013 |
| WO | 2014/036085 | A1 | 3/2014 |
| WO | 2015-107926 | A1 | 7/2015 |
| WO | 2018/199942 | A1 | 11/2018 |
| WO | 2019/012131 | A1 | 1/2019 |
| WO | 2019068638 | A1 | 4/2019 |

OTHER PUBLICATIONS

Matthias Kronlachner et al., “Spatial transformations for the enhancement of Ambisonic recordings”, ICSA Jan. 2014.
Michael M. Goodwin et al, “Multichannel surround format conversion and generalized upmix”, AES 30th International Conference, 2007, pp. 1-9, Saariselkii., Finland.
E. G. Williams, “Fourier Acoustics: Sound Radiation and Nearfield Acoustical Holography,” Academic Press, 1999, pp. 1-306.
Eric W. Weisstein, “Stereographic Projection.” From MathWorld—A Wolfram Web Resource. https://mathworld.wolfram.com/StereographicProjection.html.
Eric W. Weisstein, “Gnomonic Projection.” From MathWorld—A Wolfram Web Resource. https://mathworld.wolfram.com/GnomonicProjection.html.
Eric W. Weisstein, “Rotation Matrix.” From MathWorld—A Wolfram Web Resource. https://mathworld.wolfram.com/RotationMatrix.html.
Ville Pulkki, “Virtual Sound Source Positioning Using Vector Base Amplitude Panning”, J. Audio Eng. Soc, vol. 45 (6), Jun. 1997.
Oliver Thiergart et al, “Geometry-based Spatial Sound Acquisition Using Distributed Microphone Arrays”, IEEE Transaction on Audio, Speech, and Language Processing, vol. 21 (12), Dec. 2013.
Archontis Politis et al., “Parametric Spatial Audio Effects”, Proc. of the 15th Int, York, UK, (Sep. 17, 2012), URL: https://www.dafx12.york.ac.uk/papers/dafx12_submission_22.pdf, (Nov. 27, 2018), XP055527425, Sep. 17-21, 2012.
Lixia Liang, First notification of Office Action, dated Nov. 8, 2023, Chinese Patent Examination Cooperation Center, Hubei.
Olegs Timms, Communication pursuant to Article 94(3)EPC, Application No. 20745204.6, Mar. 7, 2024, 4 pages, European Patent Office.

* cited by examiner (full) transformation definition (e.g. matrix )

(partial) transformation definition (e.g.matrix )

(partial) transformation definition (e.g.matrix )

fully separate implementation with explicit signals in the spatial domain

APPARATUS, METHOD OR COMPUTER PROGRAM FOR PROCESSING A SOUND FIELD REPRESENTATION IN A SPATIAL TRANSFORM DOMAIN

CROSS-REFERENCES TO RELATED APPLICATIONS

This application is a continuation of copending International Application No. PCT/EP2020/071120, filed Jul. 27, 2020, which is incorporated herein by reference in its entirety, and additionally claims priority from International Application No. PCT/EP2019/070373, filed Jul. 29, 2019, which is incorporated herein by reference in its entirety.

The present invention relates to the field of spatial sound recording and reproduction.

BACKGROUND OF THE INVENTION

In general, spatial sound recording aims at capturing a sound field with multiple microphones such that at the reproduction side, the listener perceives the sound image as it was at the recording location. In the envisioned case, the spatial sound is captured in a single physical location at the recording side (referred to as reference location), whereas at the reproduction side, the spatial sound can be rendered from arbitrary different perspectives relative to the original reference location. The different perspectives include different listening positions (referred to as virtual listening positions) and listening orientations (referred to as virtual listening orientations).

Rendering spatial sound from arbitrary different perspectives with respect to an original recording location enables different applications. For example, in 6 degrees-of-freedom (6DoF) rendering, the listener at the reproduction side can move freely in a virtual space (usually wearing a head-mounted display and headphones) and perceive the audio/video scene from different perspectives. In 3 degrees-of-freedom (3DoF) applications, where e.g. a 360° video together with spatial sound was recorded in a specific location, the video image can be rotated at the reproduction side and the projection of the video can be adjusted (e.g., from a stereographic projection [WolframProj1] towards a Gnomonic projection [WolframProj2], referred to as "little planet" projection). Clearly, when changing the video perspective in 3DoF or 6DoF applications, the reproduced spatial audio perspective should be adjusted accordingly to enable consistent audio/video production.

There exist different state-of-the-art approaches that enable spatial sound recording and reproduction from different perspectives. One way would be to physically record the spatial sound in all possible listening positions and, on the reproduction side, use the recording for spatial sound reproduction that is closest to the virtual listening position.

However, this recording approach is very intrusive and would involve an unfeasibly high measurement effort. To reduce the number of physical measurement positions that may be used while still achieving spatial sound reproduction form arbitrary perspectives, non-linear parametric spatial sound recording and reproduction techniques can be used. An example is the directional audio coding (DirAC) based virtual microphone processing proposed in [VirtualMic]. Here, the spatial sound is recorded with microphone arrays located at only a small number (3-4) of physical locations. Afterwards, sound field parameters such as the direction-of-arrival and diffuseness of the sound can be estimated at each microphone array location and this information can then be used to synthesize the spatial sound at arbitrary spatial positions. While this approach offers a high flexibility with significantly reduced number of measurement locations, it still involves multiple measurement locations. Moreover, the parametric signal processing and violations of the assumed parametric signal model can introduce processing artifacts that might be unpleasant especially in high-quality sound reproduction applications.

SUMMARY

According to an embodiment, an apparatus for processing a sound field representation related to a defined reference point or a defined listening orientation for the sound field representation may have: a sound field processor for processing the sound field representation using a deviation of a target listening position from the defined reference point or of a target listening orientation from the defined listening orientation, to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the sound field processor is configured to process the sound field representation so that the deviation or the spatial filter is applied to the sound field representation in relation to a spatial transform domain having associated therewith a forward transform rule and a backward transform rule.

According to another embodiment, a method of processing a sound field representation related to a defined reference point or a defined listening orientation for the sound field representation may have the steps of: detecting a deviation of a target listening position from the defined reference point or of a target listening orientation from the defined listening orientation; and processing the sound field representation using the deviation to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the deviation or the spatial filter is applied to the sound field representation in relation to a spatial transform domain having associated therewith a forward transform rule and a backward transform rule.

Another embodiment may have a non-transitory digital storage medium having a computer program stored thereon to perform the method of processing a sound field representation related to a defined reference point or a defined listening orientation for the sound field representation, the method having the steps of: detecting a deviation of a target listening position from the defined reference point or of a target listening orientation from the defined listening orientation; and processing the sound field representation using the deviation to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the deviation or the spatial filter is applied to the sound field representation in relation to a spatial transform domain having associated therewith a forward transform rule and a backward transform rule, when said computer program is run by a computer.

In an apparatus or method for processing a sound field representation, a sound field processing takes place using a deviation of a target listening position from a defined reference point or a deviation of a target listening orientation from the defined listening orientation, so that a processed sound field description is obtained, wherein the processed sound field description, when rendered, provides an impression of the sound field representation at the target listening position being different from the defined reference point. Alternatively or additionally, the sound field processing is performed in such a way that the processed sound field description, when rendered, provides an impression of the sound field representation for the target listening orientation being different from the defined listening orientation. Alternatively or additionally, the sound field processing takes place using a spatial filter wherein a processed sound field description is obtained, where the processed sound field description, when rendered, provides an impression of a spatially filtered sound field description. Particularly, the sound field processing is performed in relation to a spatial transform domain. Particularly, the sound field representation comprises a plurality of audio signals in an audio signal domain, where these audio signals can be loudspeaker signals, microphone signals, Ambisonics signals or other multi-audio signal representations such as audio object signals or audio object coded signals. The sound field processor is configured to process the sound field representation so that the deviation between the defined reference point or the defined listening orientation and the target listening position or the target listening orientation is applied in a spatial transform domain having associated therewith a forward transform rule and a backward transform rule. Furthermore, the sound field processor is configured to generate the processed sound field description again in the audio signal domain, where the audio signal domain, once again, is a time domain or a time/frequency domain, and the processed sound field description may comprise Ambisonics signals, loudspeaker signals, binaural signals and/or audio object signals or encoded audio object signals as the case may be.

Depending on the implementation, the processing performed by the sound field processor may comprise a forward transform into the spatial transform domain and the signals in the spatial transform domain, i.e., the virtual audio signals for virtual speakers at virtual positions are actually calculated and, depending on the application, spatially filtered using a spatial filter in the transform domain or are, without any optional spatial filtering, transformed back into the audio signal domain using the backward transform rule. Thus, in this implementation, virtual speaker signals are actually calculated at the output of a forward transform processing and the audio signals representing the processed sound field representation are actually calculated as an output of a backward spatial transform using a backward transform rule.

In another implementation, however, the virtual speaker signals are not actually calculated. Instead, only the forward transform rule, an optional spatial filter and a backward transform rule are calculated and combined to obtain a transformation definition, and this transformation definition is applied, advantageously in the form of a matrix, to the input sound field representation to obtain the processed sound field representation, i.e., the individual audio signals in the audio signal domain. Hence, such a processing using a forward transform rule, an optional spatial filter and a backward transform rule results in the same processed sound field representation as if the virtual speaker signals were actually calculated. However, in such a usage of a transformation definition, the virtual speaker signals do not actually have to be calculated, but only a combination of the individual transform/filtering rules such as a matrix generated by combining the individual rules is calculated and is applied to the audio signals in the audio signal domain.

Furthermore, another embodiment relates to the usage of a memory having precomputed transformation definitions for different target listening positions and/or target orientations, for example for a discrete grid of positions and orientations. Depending on the actual target position or target orientation, the best matching pre-calculated and stored transformation definition has to be identified in the memory, retrieved from the memory and applied to the audio signals in the audio signal domain.

The usage of such pre-calculated rules or the usage of a transformation definition—be it the full transformation definition or only a partial transformation definition—is useful, since the forward spatial transform rule, the spatial filtering and the backward spatial transform rule are all linear operations and can be combined with each other and applied in a "single-shot" operation without an explicit calculation of the virtual speaker signals.

Depending on the implementation, a partial transformation definition obtained by combining the forward transform rule and the spatial filtering on the one hand or obtained by combining the spatial filtering and the backward transform rule can be applied so that only either the forward transform or the backward transform is explicitly calculated using virtual speaker signals. Thus, the spatial filtering can be either combined with the forward transform rule or the backward transform rule and, therefore, processing operations can be saved as the case may be.

Embodiments are advantageous in that a sound scene modification is obtained related to a virtual loudspeaker domain for a consistent spatial sound reproduction from different perspectives.

Embodiments describe a practical way where the spatial sound is recorded in or represented with respect to a single reference location while still allowing to change the audio perspective at will at the reproduction side. The change in the audio perspective can be e.g. rotation or translation, but also effects such an acoustical zoom including spatial filtering. The spatial sound at the recording side can be recorded using for example a microphone array, where the array position represents the reference position (it is referred to a single recording location even though the microphone array may consist of multiple microphones located at slightly different positions, whereas the extend of the microphone array is negligible compared to the size of the recording side). The spatial sound at the recording location also can be represented in terms of a (higher-order) Ambisonics signal. Moreover, the embodiments can be generalized to use loudspeaker signals as input, whereas the sweet spot of the loudspeaker setup represents the single reference location.

In order to change the perspective of the recorded spatial audio relative to the reference location, the recorded spatial sound is transformed into a virtual loudspeaker domain. By changing the positions of the virtual loudspeakers and filtering the virtual loudspeaker signals depending on the virtual listening position and orientation relative to the reference position, the perspective of the spatial sound can be adjusted as desired. In contrast to the state-of-the-art parametric signal processing [VirtualMic], the presented approach is completely linear avoiding non-linear processing artifacts. The authors in [AmbiTrans] describe a related approach where a spatial sound scene is modified in the virtual loudspeaker domain, e.g., to achieve rotation, warping, and directional loudness modification. However, this approach does not reveal how the spatial sound scene can be modified to achieve a consistent audio rendering at an arbitrary virtual listening position relative to the reference location. Moreover, the approach in [AmbiTrans] describes the processing for Ambisonics input only, whereas embodiments relate to Ambisonics input, microphone input, and loudspeaker input.

Further implementations relate to a processing where a spatial transformation of the audio perspective is performed and optionally a corresponding spatial filtering in order to mimic different spatial transformations of corresponding video image such as a spherical video. Input and output of the processing are, in an embodiment, first-order Ambisonics (FOA) or higher-order Ambisonics (HOA) signals. As stated, the entire processing can be implemented as a single matrix multiplication.

BRIEF DESCRIPTION OF THE DRAWINGS

Embodiments of the present invention will be detailed subsequently referring to the appended drawings, in which.

DETAILED DESCRIPTION OF THE INVENTION

Figure 8:
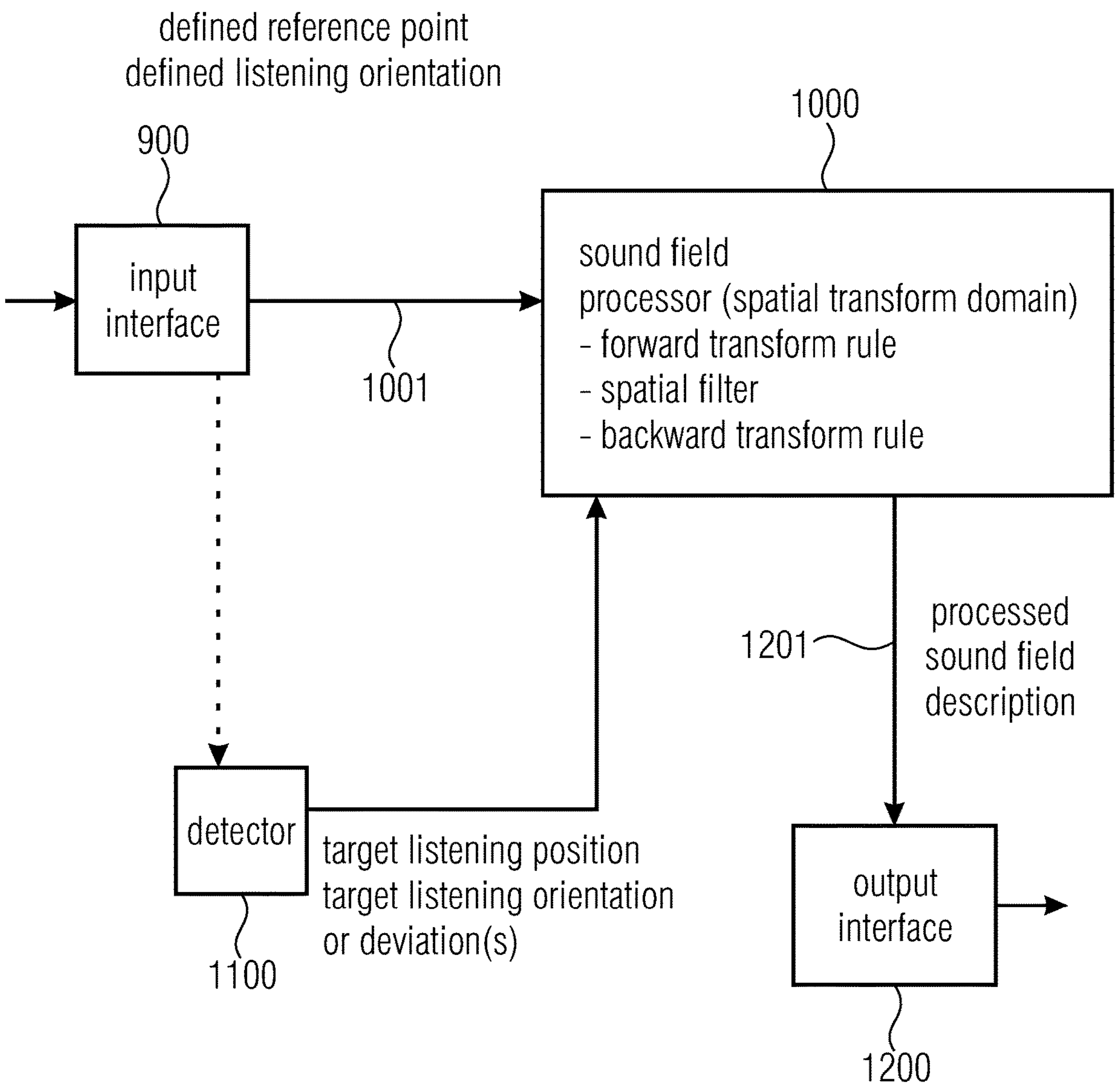
FIG. 8 illustrates an embodiment of the apparatus for processing a sound field representation in an embodiment.

FIG. 8 illustrates an apparatus for processing a sound field representation related to a defined reference point or a defined listening orientation for the sound field representation. The sound field representation is obtained via an input interface 900 and, at the output of the input interface 900, a sound field representation 1001 related to the defined reference point or the defined listening orientation is available. Furthermore, this sound field representation is input into a sound field processor 1000 that operates in relation to a spatial transform domain. In other words, the sound field processor 1000 is configured to process the sound field representation so that the deviation or the spatial filter 1030 is applied in a spatial transform domain having associated therewith a forward transform rule 1021 and a backward transform rule 1051.

Particularly, the sound field processor is configured for processing the sound field representation using a deviation of a target listening position from the defined reference point or using a deviation of a target listening orientation from the defined listening orientation. The deviation is obtained by a detector 1100. Alternatively or additionally, the detector 1100 is implemented to detect the target listening position or the target listening orientation without actually calculating the deviation. The target listening position and/or the target listening orientation or, alternatively, the deviation between the defined reference point and the target listening position or the deviation between the defined listening orientation and the target listening orientation are forwarded to the sound field processor 1000. The sound field processor processes the sound field representation using the deviation so that a processed sound field description is obtained, wherein the processed sound field description, when rendered, provides an impression of the sound field representation at the target listening position being different from the defined reference point or for the target listening orientation being different from the defined listening orientation. Alternatively or additionally, the sound field processor is configured for processing the sound field representation using a spatial filter, so that a processed sound field description is obtained, wherein the processed sound field description, when rendered, provides an impression of a spatially filtered sound field description, i.e., a sound field description that has been filtered by the spatial filter.

Hence, irrespective of whether a spatial filtering is performed or not, the sound field processor 1000 is configured to process the sound field representation so that the deviation or the spatial filter 1030 is applied in a spatial transform domain having associated therewith a forward transform rule 1021 and a backward transform rule 1051. The forward and backward transform rules are derived using a set of virtual speakers at virtual positions, but it is not necessary to explicitly calculate the signals for the virtual speakers.

Advantageously, the sound field representation comprises a number of sound field components which is greater than or equal to two or three. Furthermore, and advantageously, the detector 1100 is provided as an explicit feature of the apparatus for processing. In another embodiment, however, the sound field processor 1000 has an input for the target listening position or target listening orientation or a corresponding deviation. Furthermore, the sound field processor 1000 outputs a processed sound field description 1201 that can be forwarded to an output interface 1200 and then output for a transmission or storage of the processed sound field description 1201. One kind of transmission is, for example, an actual rendering of the processed sound field description via (real) loudspeakers or via a headphone in relation to the binaural output. Alternatively, as, for example, in the case of an Ambisonics output, the processed sound field description 1201 is output by the output interface 1200 can be forwarded/input into an Ambisonics sound processor.

Figure 9A:
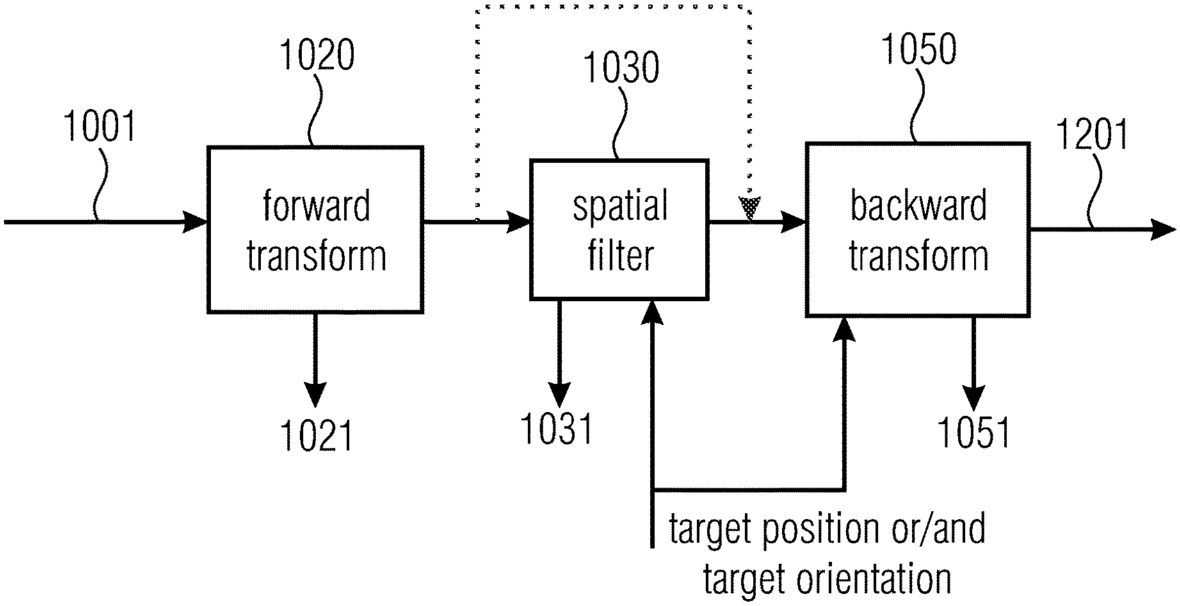
FIG. 9*a* illustrates an implementation of the sound field processor.

FIG. 9*a* illustrates an implementation of the sound field processor 1000. Particularly, the sound field representation comprises a plurality of audio signals in an audio signal domain. Thus, the input into the sound field processor 1001 comprises a plurality of audio signals and, advantageously, at least two or three different audio signals such as Ambisonics signals, loudspeaker channels, audio object data or microphone signals. The audio signal domain may be the time domain or the time/frequency domain.

Furthermore, the sound field processor 1000 is configured to process the sound field representation so that the deviation or the spatial filter is applied in a spatial transform domain having associated therewith a forward transform rule 1021 as obtained by a forward transform block 1020, and having associated a backward transform rule 1051 obtained by a backward transform block 1050. Furthermore, the sound field processor 1000 is configured to generate the processed sound field description in the audio signal domain. Thus, advantageously, the output of block 1050, i.e., the signal on line 1201 is in the same domain as the input 1001 into the forward transform block 1020.

Depending on whether an explicit calculation of virtual speaker signals is performed, the forward transform block 1020 actually performs the forward transform and the backward transform block 1050 actually transforms the backward transform. In the other implementation, where only a transform domain related processing is performed without an explicit calculation of the virtual speaker signals, the forward transform block 1020 outputs the forward transform rule 1021 and the backward transform block 1050 outputs the backward transform rule 1051 for the purpose of sound field processing. Furthermore, with respect the spatial filter implementation, the spatial filter is either applied as a spatial filter block 1030 or the spatial filter is reflected by applying a spatial filter rule 1031. Both implementations, i.e., with or without explicit calculation of the explicit virtual speaker signals are equivalent to each other, since the output of the sound field processing, i.e., signal 1201, when rendered, provides an impression of the sound field representation at the target listening position being different from the defined reference point or for the target listening orientation being different from the defined listening orientation. To this end, the spatial filter 1030 and the backward transform block 1050 may receive the target position or/and the target orientation.

Figure 9B:
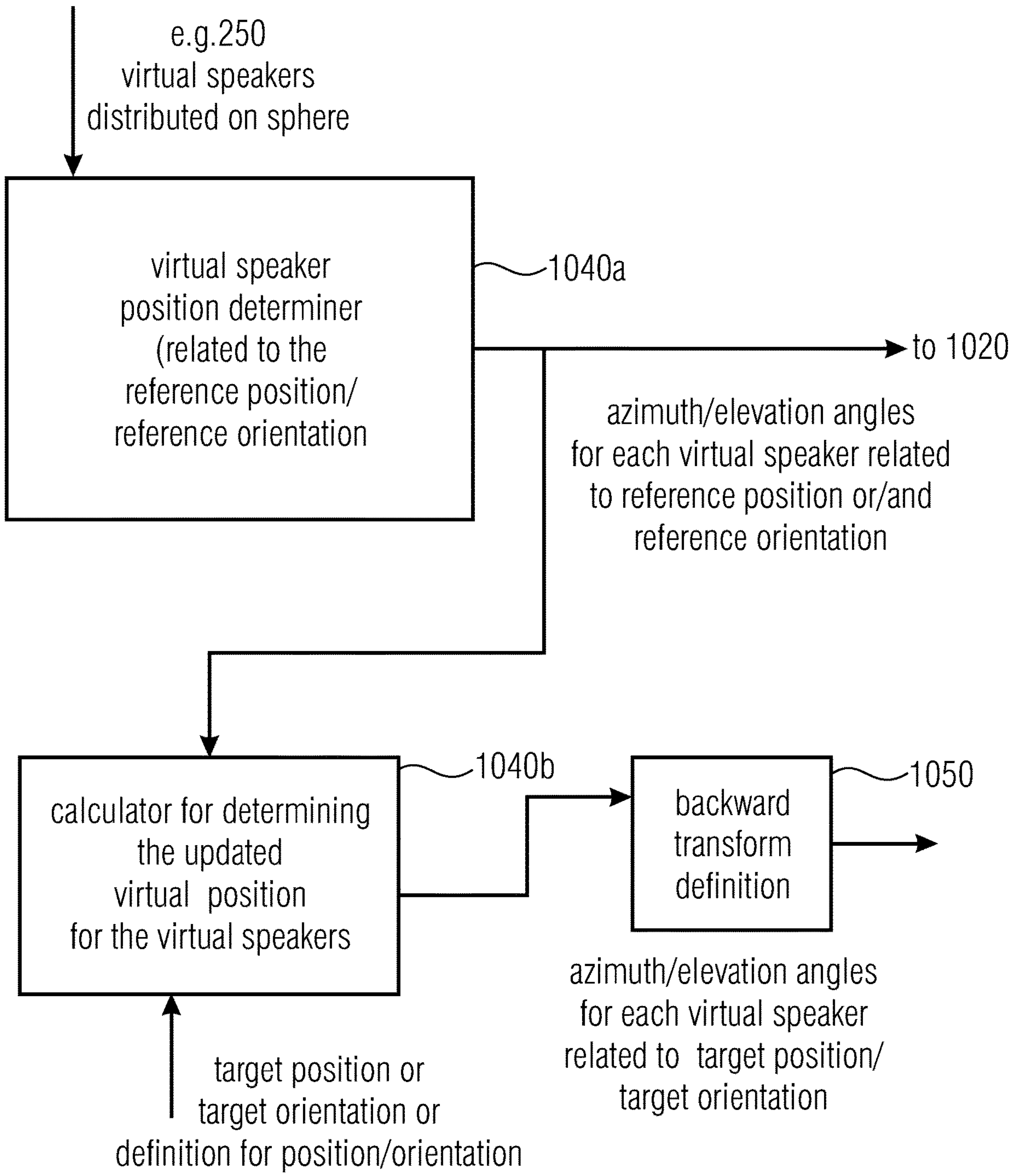
FIG. 9*b* illustrates an implementation of the position modification and backward transform definition calculation.

FIG. 9*b* illustrates an implementation of a position modification operation. To this end, a virtual speaker position determiner 1040*a* is provided. Block 1040*a* receives, as an input, a definition of a number of virtual speakers at virtual speaker positions that are, typically, equally distributed on a sphere around the defined reference point. Advantageously, 250 virtual speakers are assumed. Generally, a number of 50 virtual speakers or more virtual speakers and/or a number of 500 virtual speakers or less virtual speakers are sufficient to provide a useful high quality sound field processing operation.

Depending on the given virtual speakers and depending on the reference position and/or reference orientation, block 1040*a* generates azimuth/elevation angles for each virtual speaker related to the reference position or/and the reference orientation. This information is advantageously input into the forward transform block 1020 so that the virtual speaker signals for the virtual speakers defined at the input into block 1040*a* can be explicitly (or implicitly) calculated.

Depending on the implementation, other definitions for the virtual speakers different from azimuth/elevation angles can be given such as Cartesian coordinates or a Cartesian direction information such as vectors pointing into the orientation that would correspond to the orientation of a speaker directed to the corresponding original or predefined reference position on the one hand or, with respect to the backward transform, directed to the target orientation.

Block 1040*b* receives, as an input, the target position or the target orientation or alternatively or additionally, the deviation for the position/orientation between the defined reference point or the defined listening orientation from the target listening position or the target listening orientation. Block 1040*b* then calculates, from the data generated by block 1040*a* and the data input into block 1040*b* the azimuth/elevation angles for each virtual speaker related to the target position or/and the target orientation and, this information is input into the backward transform definition 1050. Thus, block 1050 can either actually apply the backward transform rule with the modified virtual speaker positions/orientations or can output the backward transform rule 1051 as indicated in FIG. 9*a* for an implementation without the explicit usage and handling of the virtual speaker signals.

Figure 10A:
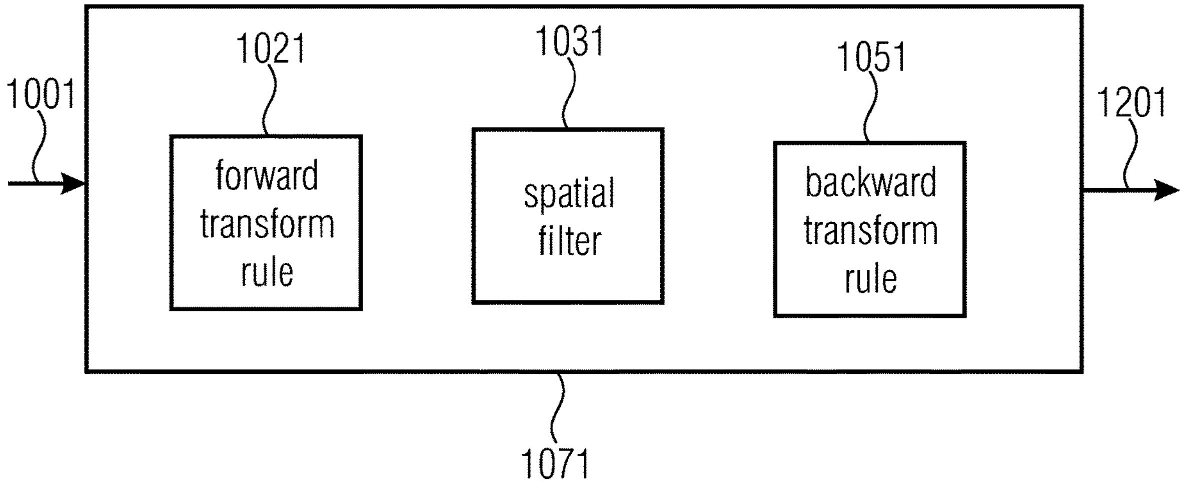
FIG. 10*a* illustrates an implementation using a full transformation definition.

FIG. 10*a* illustrates an implementation related to the usage of a full transformation definition such as a transform matrix consisting of the forward transform rule 1021, the spatial filter 1031 and the backward transform rule 1051 so that, from the sound field representation 1001, the processed sound field representation 1201 is calculated.

Figure 10B:
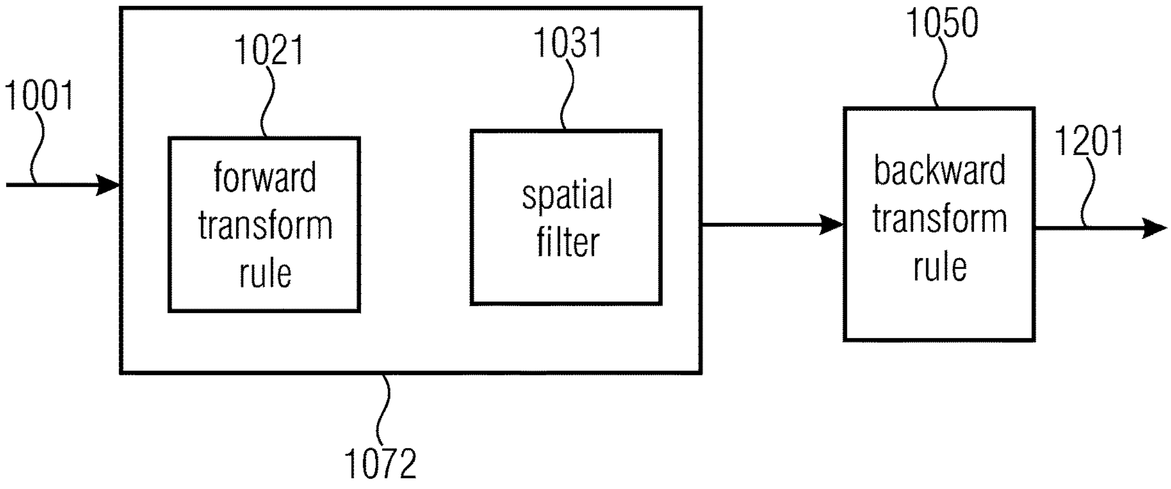
FIG. 10*b* illustrates an implementation of the sound field processor using a partial transformation definition.

In another implementation illustrated in FIG. 10*b*, a partial transformation definition such as partial transformation matrix is obtained by combining the forward transform rule 1021 and the spatial filter 1031. Thus, at the output of the partial transformation definition 1072, the spatially filtered virtual speaker signals are obtained that are then processed by the backward transform 1050 to obtain the processed sound field representation 1201.

Figure 10C:
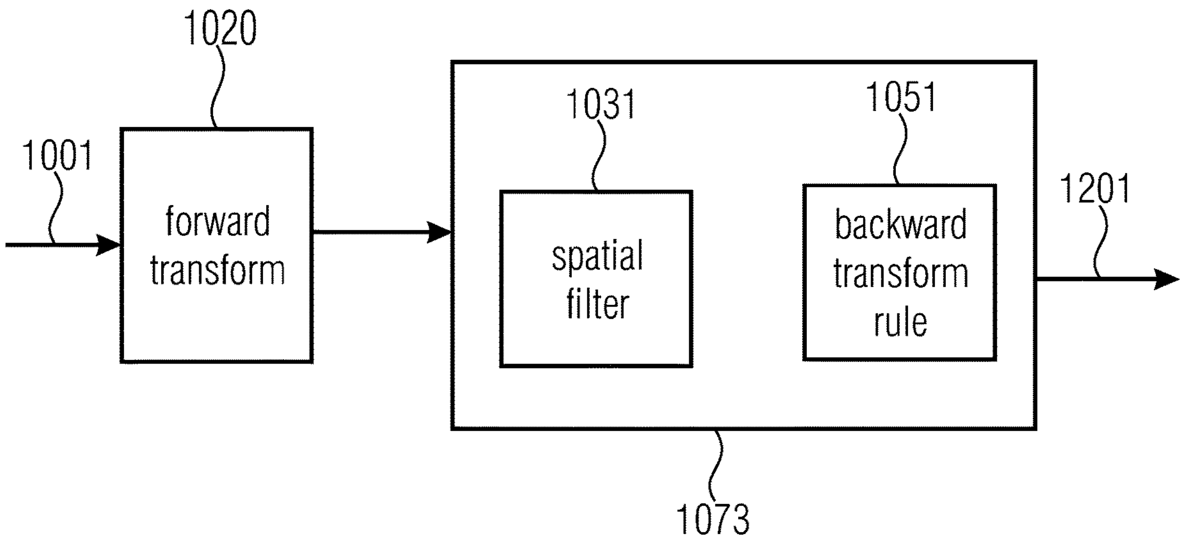
FIG. 10*c* illustrates another implementation of the sound field processor using a further partial transformation definition.

In a further implementation illustrated in FIG. 10*c*, the sound field representation is input into the forward transform 1020 to obtain the actual virtual speaker signals at the input into the spatial filter. Another (partial) transformation definition 1073 is calculated by the combination of the spatial filter 1031 and the backward transform rule 1051. Thus, at the output of the block 1201, the processed sound field representation, for example, the plurality of audio signals in the audio signal domain such as a time domain or a time/frequency domain are obtained.

Figure 10D:
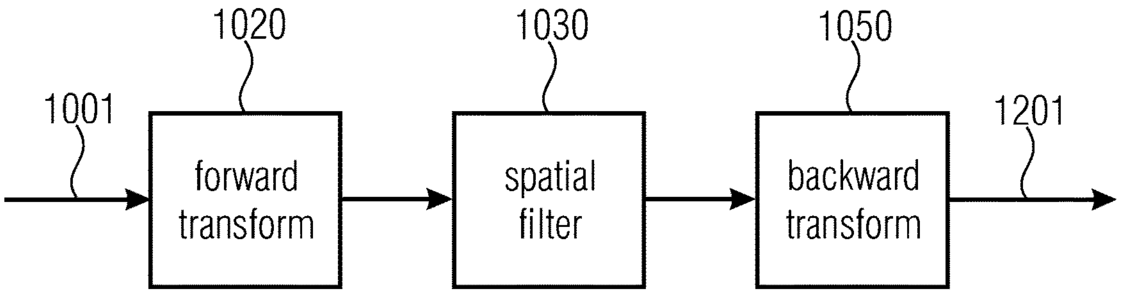
FIG. 10*d* illustrates an implementation of the sound field processor using an explicit calculation of virtual speaker signals.

FIG. 10*d* illustrates a fully separate implementation with explicit signals in the spatial domain. In this implementation, the forward transform is applied on the sound field representation and, at the output of block 1020, a set of, for example, 250 virtual speaker signals is obtained. The spatial filter 1030 is applied and, at the output of block 1030, a set of spatially filtered, for example, 250 virtual speaker signals is obtained. The set of spatially filtered virtual speaker signals are subjected to the spatial backward transform 1050 to obtain, at the output, the processed sound field representation 1201.

Depending on the implementation, a spatial filtering using the spatial filter 1031 is performed or not. In case of using a spatial filter, and in case of not performing any position/orientation modification, the forward transform 1020 and the backward transform 1050 rely on the same virtual speaker positions. Nevertheless, the spatial filter 1031 has been applied in the spatial transform domain irrespective of whether the virtual speaker signals are explicitly calculated or not.

Furthermore, in case of not performing any spatial filtering, the modification of the listening position or the listening orientation to the target listening position and the target orientation is performed and, therefore, the virtual speaker position/orientations will be different in the inverse/backward transform on the one hand and the forward transform on the other hand.

Figure 11A:
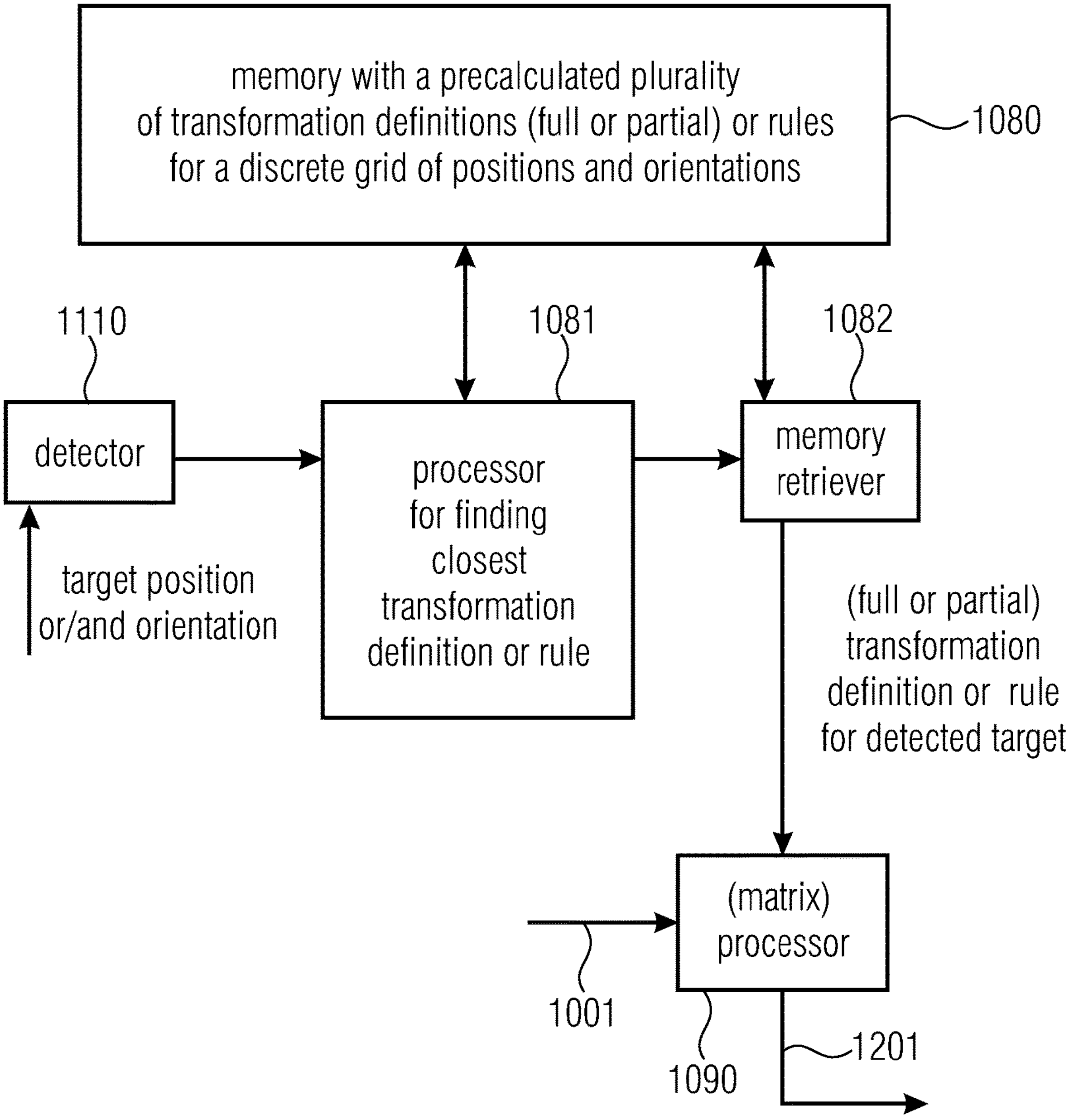
FIG. 11*a* illustrates an embodiment using a memory with pre-calculated transformation definitions or rules.
Figure 11B:
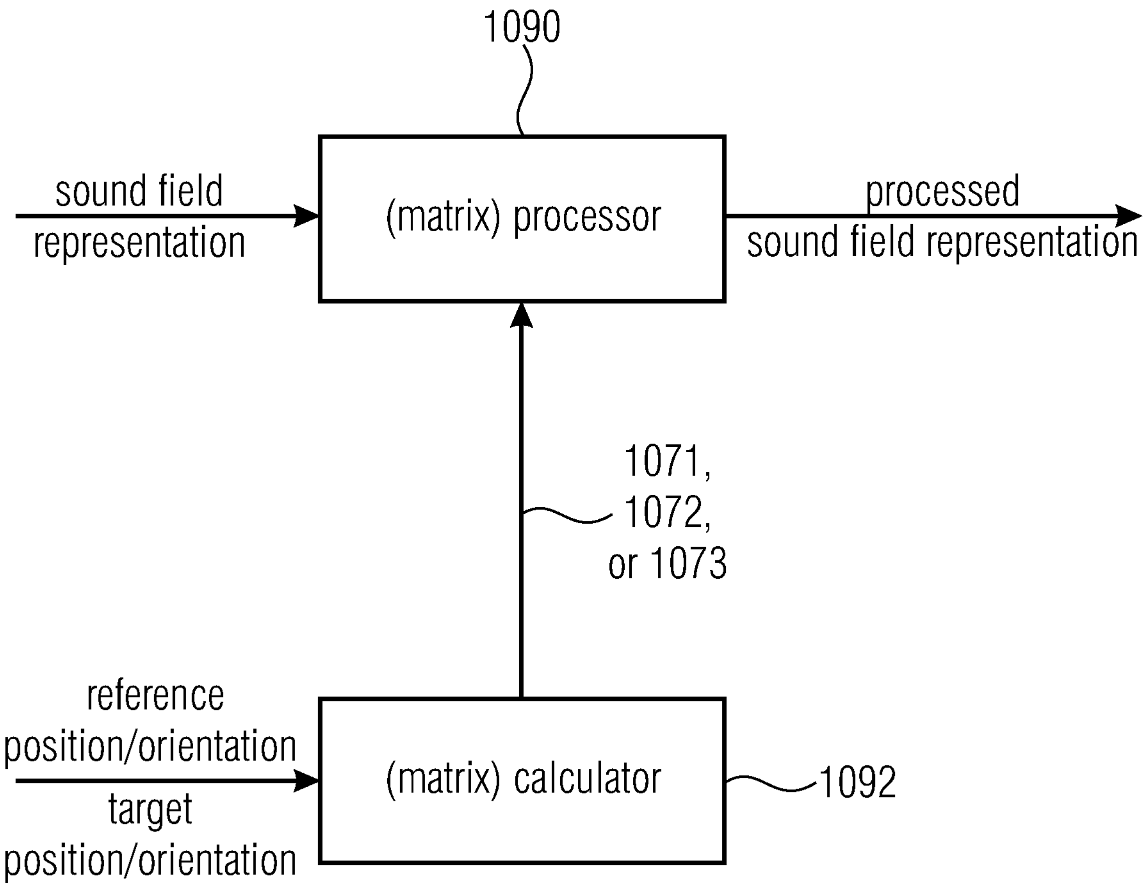
FIG. 11*b* illustrates an embodiment using a processor and a transformation definition calculator.

FIG. 11*a* illustrates an implementation of the sound field processor in the context of a memory with a pre-calculated plurality of transformation definitions (full or partial) or forward, backward or filter rules for a discrete grid of positions and/or orientations as indicated at 1080.

The detector 1100 is configured to detect the target position and/or target orientation and forwards this information to a processor 1081 for finding the closest transformation definition or forward/backward/filtering rule within the memory 1080. To this end, the processor 1081 has knowledge of the discrete grid of positions and orientations, at which the corresponding transformation definitions or pre-calculated forward/backward/filtering rules are stored. As soon as the processor 1081 has identified the closest grid point matching with the target position or/and target orientation as close as possible, this information is forwarded to a memory retriever 1082 which is configured to retrieve the corresponding full or partial transformation definition or forward/backward/filtering rule for the detected target position and/or orientation. In other embodiments, it is not necessary to use the closest grid point from a mathematical point of view. Instead, it may be useful to determine a grid point being not the closest one, but a grid point being related to the target position or orientation. An example may be that the grid point being, from a mathematical point of view not the closest but the second or third closest or fourth closest is better than the closest one. A reason is that the optimization has more than one dimension and it might be better to allow a greater deviation for the azimuth but a smaller deviation from the elevation. This information is input into a corresponding (matrix) processor 1090 that receives, as an input, the sound field representation and that outputs the processed sound field representation 1201. The pre-calculated transformation definition may be a transform matrix having a dimension of N rows and M columns, wherein N and M are integers greater than 2, and the sound field representation has M audio signals, and the processed sound field representation 1201 has N audio signals. In a mathematically transposed formulation, the situation can be vice versa, i.e. the pre-calculated transformation definition may be a transform matrix having a dimension of M rows and N columns, or the sound field representation has N audio signals, and the processed sound field representation 1201 has M audio signals.

FIG. 11*a* illustrates another implementation of the matrix processor 1090. In this implementation, the matrix processor is fed by the matrix calculator 1092 that receives, as an input, a reference position/orientation and a target position/orientation or, although not shown in the figure, a corresponding deviation. Based on this deviation, the calculator 1092 calculates any of the partial or full transformation definitions as discussed with respect to FIG. 10*c* and, forwards this rule to the matrix processor 1090. In case of a full transformation definition 1071, the matrix processor 1090 performs, for example, for each time/frequency tile as obtained by an analysis filterbank, a single matrix operation using a combined matrix 1071. In case of a partial transformation definition 1072 or 1073, the processor 1090 performs an actual forward or backward transform and, additionally, a matrix operation to either obtain filtered virtual speaker signals for the case of FIG. 10*b* or to obtain, from the set of virtual loudspeaker signals, the processed sound filter representation 1201 in the audio signal domain.

In the following sections, embodiments are described and it is explained how different spatial sound representations can be transformed into the virtual loudspeaker domain and then modified to achieve a consistent spatial sound production at an arbitrary virtual listening position (including arbitrary listening orientations), which is defined relative to the original reference location.

Figure 1:
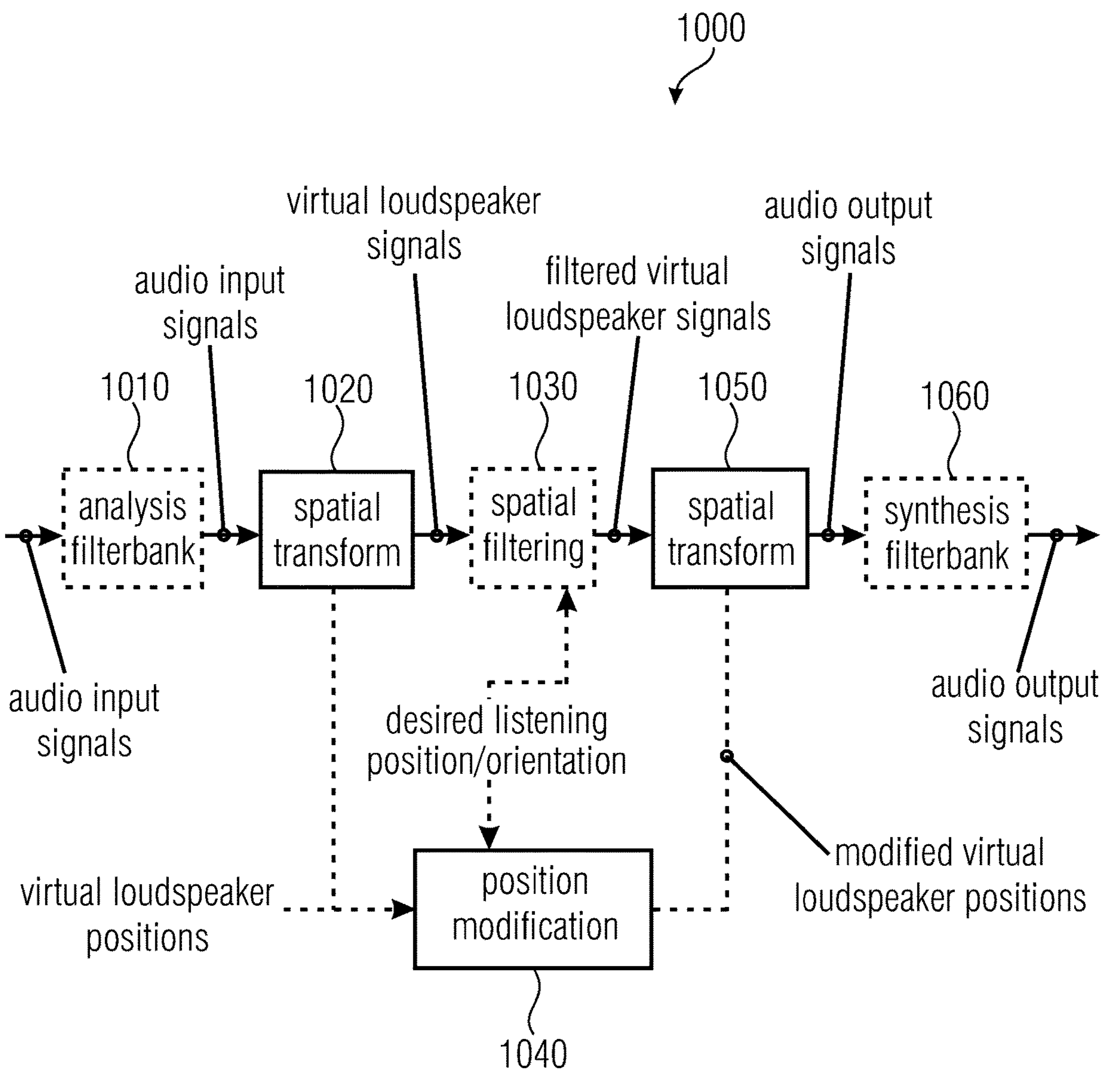
FIG. 1 illustrates an overview block diagram of a sound field processor.

FIG. 1 shows an overview block diagram of the proposed novel approach. Some embodiments will only use a subset of the building blocks shown in the overall diagram and discard certain processing blocks depending on the application scenario.

The input to embodiments are multiple (two or more) audio input signals in the time domain or time-frequency domain. Time domain input signals optionally can be transformed into the time-frequency domain using an analysis filterbank (1010). The input signals can be, e.g., loudspeaker signals, microphone signals, audio object signals, or Ambisonics components. The audio input signals represent the spatial sound field related to a defined reference position and orientation. The reference position and orientation can be, e.g., the sweet spot facing 0° azimuth and elevation (for loudspeaker input signals), the microphone array position and orientation (for microphone input signals), or the center of the coordinate system (for Ambisonics input signals).

The input signals are transformed into the virtual loudspeaker domain using a first or forward spatial transform (1020). The first spatial transform (1020) can be, e.g., beamforming (when using microphone input signals), loudspeaker signal up-mixing (when using loudspeaker input signals), or a plane wave decomposition (when using Ambisonics input signals). For audio object input signal, the first spatial transform can be an audio object renderer (e.g., a VBAP [Vbap] renderer). The first spatial transform (1020) is computed based on a set of virtual loudspeaker positions. Normally, the virtual loudspeaker positions can be defined uniformly distributed over the sphere and centered around the reference position.

Optionally, the virtual loudspeaker signals can be filtered using spatial filtering (1030). The spatial filtering (1030) is used to filter the sound field representation in the virtual loudspeaker domain depending on the desired listening position or orientation. This can be used, e.g., to increase the loudness when the listening position is getting closer to the sound sources. The same is true for a specific spatial region in which e.g. such a sound object may be located.

The virtual loudspeaker positions are modified in the position modification block (1040) depending on the desired listening position and orientation. Based on the modified virtual loudspeaker positions, the (filtered) virtual loudspeaker signals are transformed back from the virtual loudspeaker domain using a second or backward spatial transform (1050) to obtain two or more desired output audio signals. The second spatial transform (1050) can be, e.g., a spherical harmonic decomposition (when the outputs signals should be obtained in the Ambisonics domain), microphone signals (when the output signals should be obtained in the microphone signal domain), or loudspeaker signals (when the output signals should be obtained in the loudspeaker domain). The second spatial transform (1050) is independent of the first spatial transform (1020). The output signals in the time-frequency domain optionally can be transformed into the time domain using a synthesis filterbank (1060).

Due to the position modification (1040) of the virtual listening positions, which are then used in the second spatial transform (1050), the output signals represent the spatial sound at the desired listening position with the desired look direction, which may be different from the reference position and orientation.

In some applications, embodiments are used together with a video application for consistent audio/video reproduction, e.g., when rendering the video of a 360° camera from different, user-defined perspectives. In this case, the reference position and orientation usually correspond to the initial position and orientation of the 360° video camera. The desired listening position and orientation, which is used to compute the modified virtual loudspeaker positions in block (1040), then corresponds to the user-defined viewing position and orientation within the 360° video. By doing so, the output signals computed in block (1050) represent the spatial sound from the perspective of the user-defined position and orientation within the 360° video. Clearly, the same principle may apply to applications that do not fully cover the full (360°) field of view, but only parts of it, e.g., applications that allow user-defined viewing position and orientation in (e.g., 180° field of view applications).

In an embodiment the sound field representation is associated with a three dimensional video or spherical video and the defined reference point is a center of the three dimensional video or the spherical video. The detector 110 is configured to detect a user input indicating an actual viewing point being different from the center, the actual viewing point being identical to the target listening position, and the detector is configured to derive the detected deviation from the user input, or the detector 110 is configured to detect a user input indicating an actual viewing orientation being different from the defined listening orientation directed to the center, the actual viewing orientation being identical to the target listening orientation, and the detector is configured to derive the detected deviation from the user input. The spherical video may be a 360 degrees video, but other (partial) spherical videos can be used as well such as spherical videos covering 180 degrees or more.

In a further embodiment, the sound field processor is configured to process the sound field representation so that the processed sound field representation represents a standard or little planet projection or a transition between the standard or the little planet projection of at least one sound object included in the sound field description with respect to a display area for the three dimensional video or the spherical video, the display area being defined by the user input and a defined viewing direction. Such as transition is, e.g., when the magnitude of h in FIG. 7*b* is between zero and the full length extending from the center point to point S.

Embodiments can be applied to achieve an acoustic zoom, which mimics a visual zoom. In a visual zoom, when zooming in on a specific region, the region of interest (in the image center) visually appears closer whereas undesired video objects at the image side move outwards and eventually disappear from the image. Acoustically, a consistent audio rendering would mean that when zooming in, audio sources in zoom direction become louder whereas audio sources at the side move outwards and eventually become silent. Clearly, such an effect corresponds to moving the virtual listening position closer to the virtual loudspeaker that is located in zoom direction (see Embodiment 3 for more details). Moreover, the spatial window in the spatial filtering (1030) can be defined such that the signals of the virtual loudspeakers are attenuated when the corresponding virtual loudspeakers are outside the region of interest according to the zoomed video image (see Embodiment 2 for more details).

In many applications, the input signals used in block (1020) and the output signals computed in block (1050) are represented in the same spatial domain with the same number of signals. This means, for example, if Ambisonics components of a specific Ambisonics order are used as input signals, the output signals correspond to Ambisonics components of the same order. Nevertheless, it is possible that the output signals computed in block (1050) can be represented in a different spatial domain and with a different number of signals compared to the input signals. For example, it is possible to use Ambisonics components of a specific order as input signals while computing the output signals in the loudspeaker domain with a specific number of channels.

In the following, specific embodiments of the processing blocks in FIG. 1 are explained. For the analysis filterbank (1010) and synthesis filterbank (1060), respectively, one can use a state-of-the-art filterbank or time-frequency transform, such as the short-time Fourier transform (STFT). Typically, one can use an STFT with a transform length of 1024 samples and a hop-size of 512 samples at a sampling frequency of 48000 Hz. Normally, the processing is carried out individually for each time and frequency. Without loss of generality, a time-frequency domain processing is illustrated in the following. However, the processing also can be carried out in an equivalent way in the time-domain.

Figure 12A:
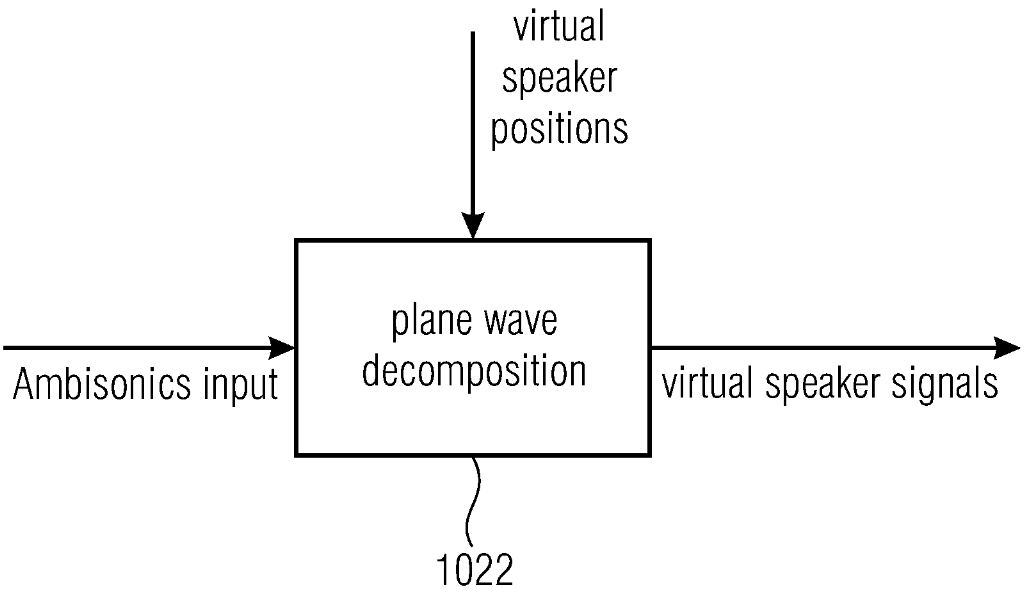
FIG. 12*a* illustrates an embodiment of the spatial transform for an Ambisonics input.

Embodiment 1a: First Spatial Transform (1020) for Ambisonics Input (FIG. 12*a*)

In this embodiment, the input to the first spatial transform (1020) is an L-th order Ambisonics signal in the time-frequency domain. An Ambisonics signal represents a multi-channel signal where each channel (referred to as Ambisonics component or coefficient) is equivalent to the coefficient of a so-called spatial basis function. There exist different types of spatial basis functions, for example spherical harmonics [FourierAcoust] or cylindrical harmonics [FourierAcoust]. Cylindrical harmonics can be used when describing the sound field in the 2D space (for example for 2D sound reproduction) whereas spherical harmonics can be used to describe the sound field in the 2D and 3D space (for example for 2D and 3D sound reproduction). Without loss of generality, the latter case with spherical harmonics is considered in the following. In this case, the Ambisonics signal consists of $(L+1)^2$ separate signals (components) and is denoted by the vector $$a(k,n)=[A_{0,0}(k,n),A_{1,-1}(k,n),\ldots,A_{l,m}(k,n),\ldots,A_{L,L}(k,n)]^T$$

where k and n are the frequency index and time index, respectively, $0\le l\le L$ is the level (order), and $-l\le m\le l$ is the mode of the Ambisonics coefficient (component) $A_{l,m}(k,n)$. First-order Ambisonics signals (L=1) can be measured e.g. using a SoundField microphone. Higher-order Ambisonics signals can be measured e.g. using an EigenMike.

The recording location represents the center of the coordinate system and reference position, respectively.

To convert the Ambisonics signal a(k,n) into the virtual loudspeaker domain, it is advantageous to apply a state-of-the-art plane wave decomposition (PWD) 1022, i.e., inverse spherical harmonic decomposition, on a(k,n), which can be computed as [FourierAcoust]

$$S(\varphi_j,\vartheta_j)=\sum_{l=0}^{L}\sum_{m=-l}^{l}A_{l,m}(k,n)Y_{l,m}(\varphi_j,\vartheta_j)$$

The term $Y_{l,m}(\varphi_j, \vartheta_j)$ is the spherical harmonic [FourierAcoust] of order/and mode m evaluated at azimuth angle $\varphi_j$ and elevation angle $\vartheta_j$. The angles $(\varphi_j, \vartheta_j)$ represent the position of the j-th virtual loudspeaker. The signal $S(\varphi_j, \vartheta_j)$ can be interpreted as the signal of the j-th virtual loudspeaker.

Figure 2:
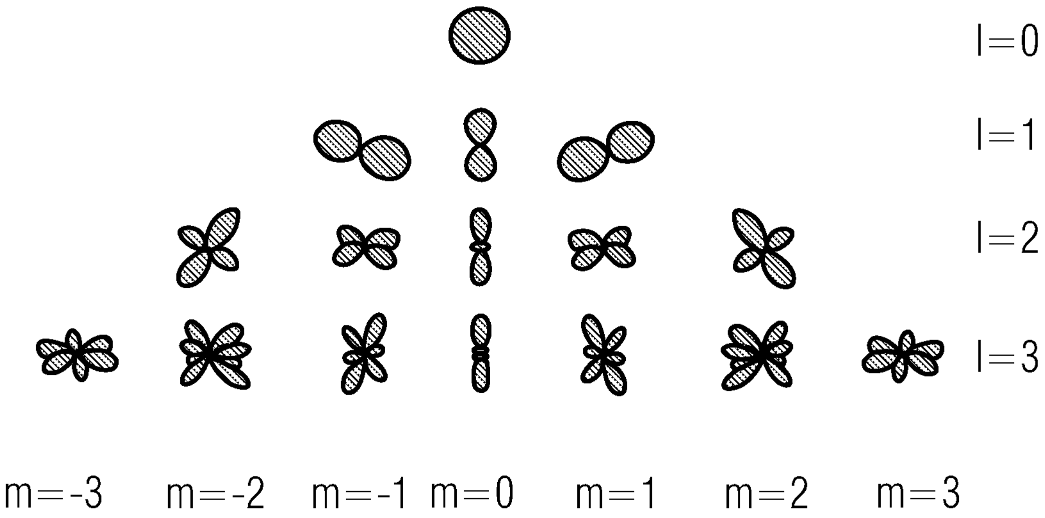
FIG. 2 illustrates a visualization of spherical harmonics for different orders and modes.

An example of spherical harmonics is shown in FIG. 2, which shows spherical harmonic functions for different levels (orders) l and modes m. The order l is sometimes referred to as levels, and that the modes m may be also referred to as degrees. As can be seen in FIG. 2, the spherical harmonic of the zeros order (zeroth level) l=0 represents the omnidirectional sound pressure, whereas the spherical harmonics of the first order (first level) l=1 represent dipole components along the dimensions of the Cartesian coordinate system.

It is advantageous to define the directions $(\varphi_j, \vartheta_j)$ of the virtual loudspeakers to be uniformly distributed on the sphere. Depending on the application, however, the directions may be chosen differently. The total number of virtual loudspeaker positions is denoted by J. It should be noted that a higher number J leads to a higher accuracy of the spatial processing at the cost of higher computational complexity. In practice, a reasonable number of virtual loudspeakers is given e.g. by J=250.

The J virtual loudspeaker signals are collected in the vector defined by $$s(k,n)=[S(\varphi_1,\vartheta_1),S(\varphi_2,\vartheta_2),\ldots,S(\varphi_j,\vartheta_j),\ldots,S(\varphi_J,\vartheta_J)]^T$$

which represents the audio input signals in the virtual loudspeaker domain.

Clearly, the J virtual loudspeaker signals s(k,n) in this embodiment can be computed by applying a single matrix multiplication to the audio input signals, i.e., $$s(k,n)=C(k,\varphi_{1\ldots J},\vartheta_{1\ldots J})a(k,n)$$

where the J×L matrix $C(k, \varphi_{1\ldots J}, \vartheta_{1\ldots J})$ contains the spherical harmonics for the different levels (orders), modes, and virtual loudspeaker positions, i.e., $$C(k,\varphi_{1\ldots J},\vartheta_{1\ldots J})=\begin{bmatrix}Y_{1,1}(\varphi_1,\vartheta_1) & \cdots & Y_{L,L}(\varphi_1,\vartheta_1)\\ \vdots & \ddots & \vdots\\ Y_{1,1}(\varphi_J,\vartheta_J) & \cdots & Y_{L,L}(\varphi_J,\vartheta_J)\end{bmatrix}$$

Figure 12B:
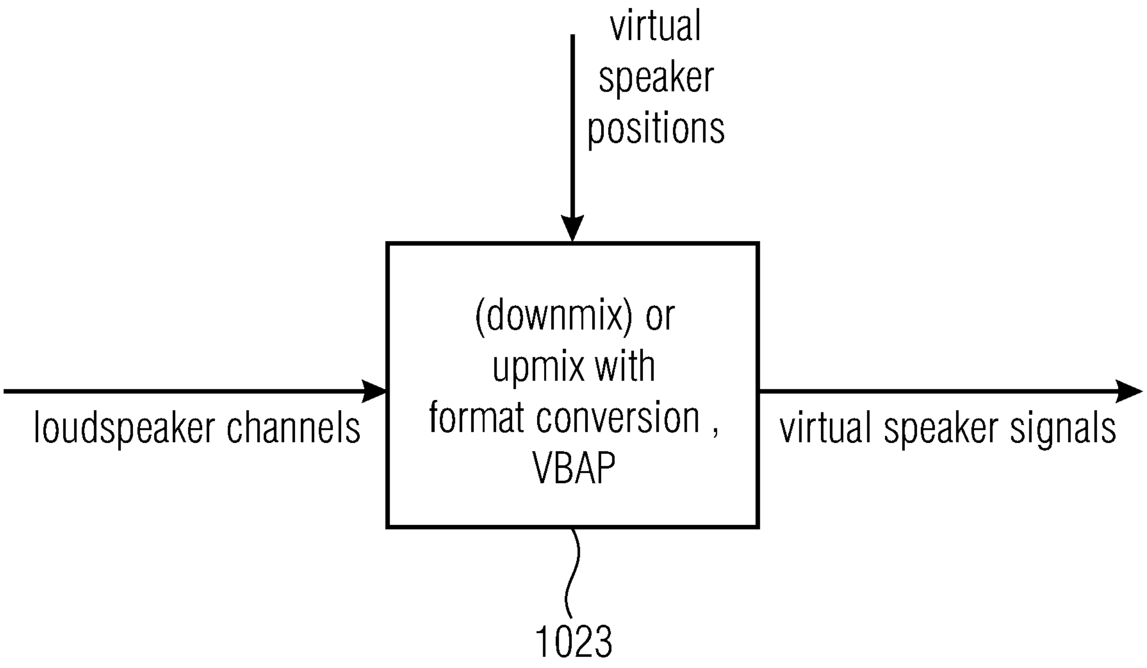
FIG. 12*b* illustrates an implementation of the spatial transform for loudspeaker channels.

Embodiment 1 b: First Spatial Transform (1020) for Loudspeaker Input (FIG. 12*b*)

In this embodiment, the input to the first spatial transform (1020) are M loudspeaker signals. The loudspeaker corresponding setup can be arbitrary, e.g., a common 5.1, 7.1, 11.1, or 22.2 loudspeaker setup. The sweet spot of the loudspeaker setup represents the reference position. The m-th loudspeaker position (m≤M) is represented by the azimuth angle $\varphi_m^{in}$ and elevation angle $\vartheta_m^{in}$.

In this embodiment, the M input loudspeaker signals can be converted into J virtual loudspeaker signals where the virtual loudspeakers are located at the angles $(\varphi_j, \vartheta_j)$. If the number of loudspeakers M is smaller than the number of virtual loudspeakers J, this represents a loudspeaker up-mix problem. If the number of loudspeakers M exceeds the number of virtual loudspeakers J, It represents a down-mix problem 1023. In general, the loudspeaker format conversion can be achieved e.g. by using a state-of-the-art static (signal-independent) loudspeaker format conversion algorithm, such as the virtual or passive up-mix explained in [FormatConv]. In this approach, the virtual loudspeaker signals are computed as $$s(k,n)=C(\varphi_{1\ldots M}^{in},\vartheta_{1\ldots M}^{in},\varphi_{1\ldots J},\vartheta_{1\ldots J})a(k,n)$$

where the vector $$a(k,n)=[A_1(k,n),A_2(k,n),\ldots,A_M(k,n)]^T$$

contains the M input loudspeaker signals in the time-frequency domain and k and n are the frequency index and time index, respectively. Moreover, $$s(k,n)=[S(\varphi_1,\vartheta_1),S(\varphi_2,\vartheta_2),\ldots,S(\varphi_j,\vartheta_j),\ldots,S(\varphi_J,\vartheta_J)]^T$$

are the J virtual loudspeaker signals. The matrix C is the static format conversion matrix which can be computed as explained in [FormatConv] by using for example the VBAP panning scheme [Vbap]. The format conversion matrix depends in the M positions of the input loudspeakers and the J positions of the virtual loudspeakers.

Advantageously, the angles ($\varphi_j$, $\vartheta_j$) of the virtual loudspeakers are uniformly distributed on the sphere. In practice, the number of virtual loudspeakers J can be chosen arbitrarily whereas a higher number leads to a higher accuracy of the spatial processing at the cost of higher computational complexity. In practice, a reasonable number of virtual loudspeakers is given e.g. by J=250.

Figure 12C:
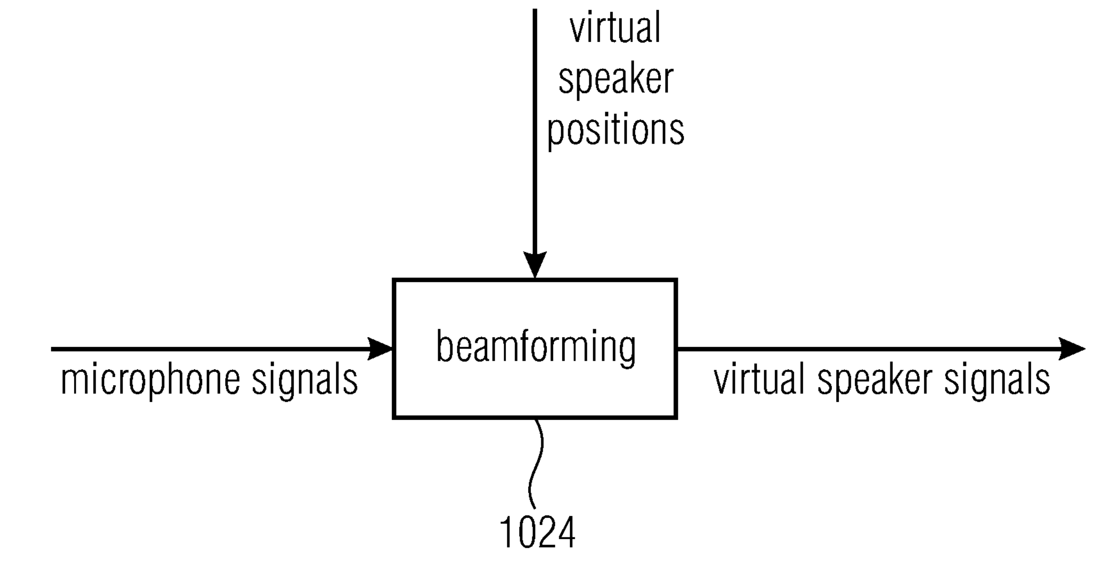
FIG. 12*c* illustrates an implementation of the spatial transform for microphone signals.

Embodiment 1 c: First Spatial Transform (1020) for Microphone Input (FIG. 12c)

In this embodiment, the input to the first spatial transform (1020) are the signals of a microphone array with M microphones. The microphones can have different directivities such as omnidirectional, cardioid, or dipole characteristics. The microphones can be arranged in different configurations, such as coincident microphone arrays (when using directional microphones), linear microphone arrays, circular microphones arrays, non-uniform planar arrays, or spherical microphone arrays. In many applications, planar or spherical microphone arrays may be used. A typical microphone array in practice is given for example by a circular microphone array with M=8 omnidirectional microphones with an array radius of 3 cm.

The M microphones are located in the positions $d_{1 \ldots M}$. The array center represents the reference position. The M microphone signals in the time-frequency domain are given $$a(k,n)=[A_1(k,n),A_2(k,n),\ldots,A_M(k,n)]^T$$

where k and n are the frequency index and time index, respectively, and $A_{1 \ldots M}(k,n)$ are the signals of the M microphones located at $d_{1 \ldots M}$.

To compute the virtual loudspeaker signals, it is advantageous to apply beamforming 1024 to the input signals a(k,n) and steer the beamformers towards the positions of the virtual loudspeakers. In general, the beamforming is computed as $$S(\varphi_j,\vartheta_j)=b_j^*(k,n)a(k,n)$$

Here, $b_j(k,n)$ are the beamformer weights to compute the signal of the j-th virtual loudspeaker, which is denoted as $S(\varphi_j, \vartheta_j)$. In general, the beamformer weights can be time and frequency-dependent. As in the previous embodiments, the angles ($\varphi_j$, $\vartheta_j$) represent the position of the j-th virtual loudspeaker. Advantageously, the directions ($\varphi_j$, $\vartheta_j$) are uniformly distributed on the sphere. The total number of virtual loudspeaker positions is denoted by J. In practice, this number can be chosen arbitrarily whereas a higher number leads to a higher accuracy of the spatial processing at the cost of higher computational complexity. In practice, a reasonable number of virtual loudspeakers is given e.g. by J=250.

Figure 3:
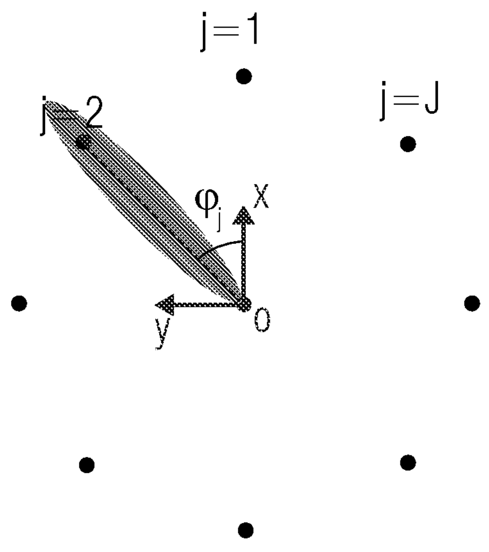
FIG. 3 illustrates an example beam former to obtain a virtual loudspeaker signal.

An example of the beamforming is depicted in FIG. 3. Here, $\mathcal{O}$ is the center of the coordinate system where the microphone array (denoted by the white circle) is located. This position represents the reference position. The virtual loudspeaker positions are denoted by the black dots. The beam of the j-th beamformer is denoted by the gray area.

The beamformer is directed towards the j-th loudspeaker (in this case, j=2) to create the j-th virtual loudspeaker signal.

A beamforming approach to obtain the weights $b_j(k,n)$ is to compute the so-called matched beamformer, for which the weights $b_j(k)$ are given by $$b_j(k)=\frac{h(k,\varphi_j,\vartheta_j)}{\|h(k,\varphi_j,\vartheta_j)\|^2}$$

The vector $h(k, \varphi_j, \vartheta_j)$ contains the relative transfer functions (RTFs) between the array microphones for the considered frequency band k and for the desired direction ($\varphi_j$, $\vartheta_j$) of the j-th virtual loudspeaker position. The RTFs $h(k, \varphi_j, \vartheta_j)$ for example can be measured using a calibration measurement or can be simulated using sound field models such as the plane wave model [FourierAcoust].

Besides using the matched beamformer, other beamforming techniques such as MVDR, LCMV, multi-channel Wiener filter can be applied.

The J virtual loudspeaker signals are collected in the vector defined by $$s(k,n)=[S(\varphi_1,\vartheta_1),S(\varphi_2,\vartheta_2),\ldots,S(\varphi_j,\vartheta_j),\ldots,S(\varphi_J,\vartheta_J)]^T$$

which represents the audio input signals in the virtual loudspeaker domain.

Clearly, the J virtual loudspeaker signals s(k,n) in this embodiment can be computed by applying a single matrix multiplication to the audio input signals, i.e., $$s(k,n)=C(k,\varphi_{1 \ldots J},\vartheta_{1 \ldots J})a(k,n)$$

where the J×M matrix C(k) contains the beamformer weights for the J virtual loudspeakers, i.e., $$C(k,\varphi_{1 \ldots J},\vartheta_{1 \ldots J})=[b_1(k,n),b_2(k,n),\ldots b_J(k,n)]^H$$

Figure 12D:
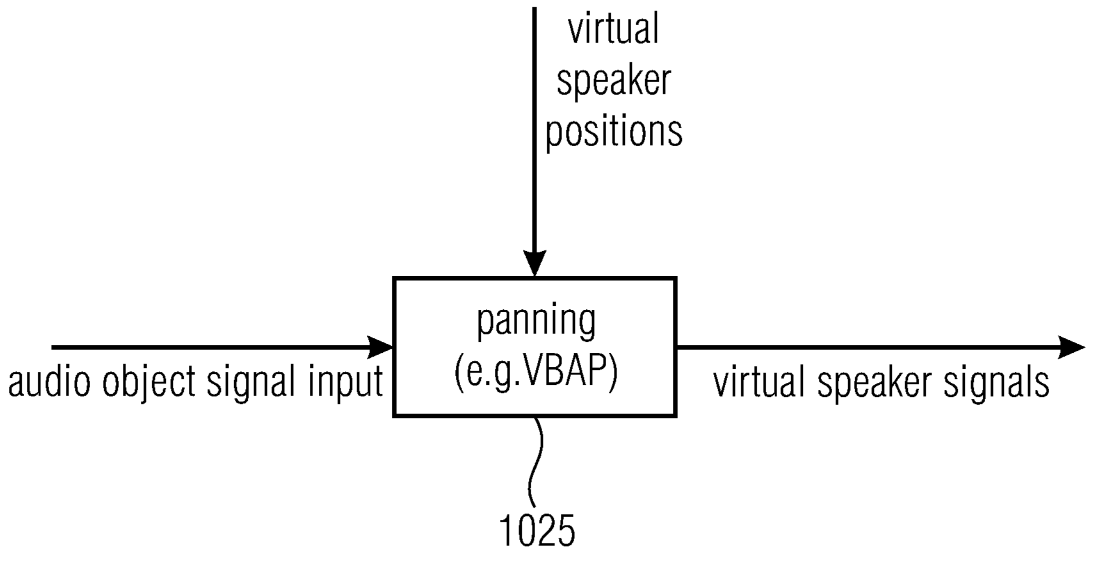
FIG. 12*d* illustrates an implementation of the spatial transform for an audio object signal input.

Embodiment 1d: First Spatial Transform (1020) for Audio Object Signal Input (FIG. 12d)

In this embodiment, the input to the first spatial transform (1020) are M audio object signals together with their accompanying position metadata. Similarly as in Embodiment 1b, the J virtual loudspeaker signals can be computed for example using the VBAP panning scheme [Vbap]. The VBAP panning scheme 1025 renders the J virtual loudspeaker signals depending on the M positions of the audio object input signals and the J positions of the virtual loudspeakers. Obviously, other rendering schemes than the VBAP panning scheme may be used instead. The audio object's positional metadata may indicate static object positions or time-varying object positions.

Embodiment 2: Spatial Filtering (1030)

The spatial filtering (1030) is applied by multiplying the virtual loudspeaker signals in s(k,n) with a spatial window $W(\varphi_j, \vartheta_j, p, 1)$, i.e., $$S'(\varphi_j, \vartheta_j) = S(\varphi_j, \vartheta_j)W(\varphi_j, \vartheta_j, p, 1)\forall j$$

where $S'(\varphi_j, \vartheta_j)$ denotes the filtered virtual loudspeaker signals. The spatial filtering (1030) can be applied for example to emphasize the spatial sound towards the look direction of the desired listening position or when the location of the desired listening position approaches the sound sources or virtual loudspeaker positions. This means that the spatial window $W(\varphi_j, \vartheta_j, p, 1)$ typically corresponds to non-negative real-valued gain values that usually are computed based on the desired listening position (denoted by vector p) and desired listening orientation or look direction (denoted by vector 1).

As an example, the spatial window $W(\varphi_j, \vartheta_j, p, 1)$ can be computed as a common first-order spatial window directed towards the desired look direction which further is attenuated or amplified according to the distance between the desired listening position and virtual loudspeaker positions, i.e., $$W(\varphi_j, \vartheta_j, p, 1) = G_j(p)\alpha + G_j(p)(1-\alpha)n_j^T l$$

Figure 4:
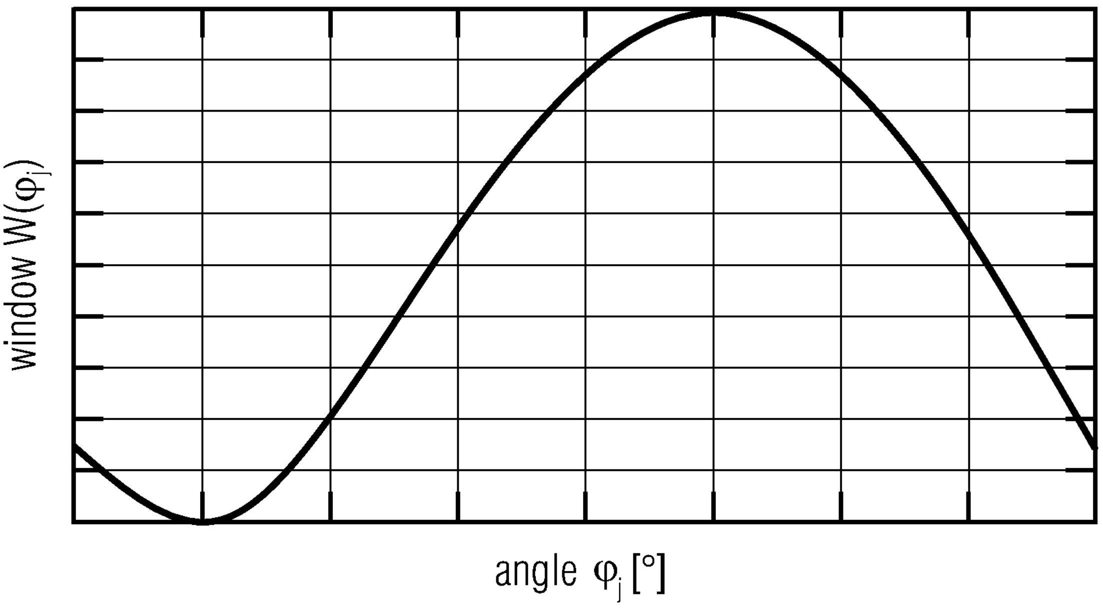
FIG. 4 shows an example spatial window used to filter virtual loudspeaker signals.
Figure 5:
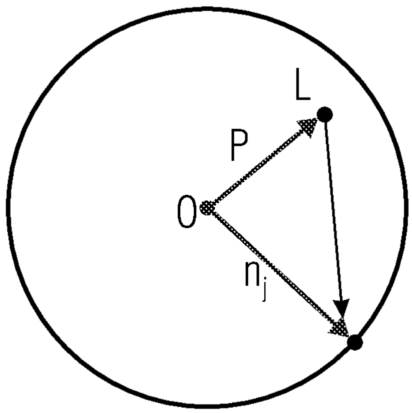
FIG. 5 shows an example reference position and listening position in a considered coordinate system.

Here, $n_j=[\cos\varphi_j \cos\vartheta_j, \sin\varphi_j \cos\vartheta_j, \sin\vartheta_j]^T$ is the direction vector corresponding to the j-th virtual loudspeaker position and $1=[\cos\phi \cos\theta, \sin\phi \cos\theta, \sin\theta]^T$ is the direction vector corresponding to the desired listening orientation with $\phi$ being the azimuth angle and $\theta$ being the elevation angle of the desired listening orientation. Moreover, $\alpha$ is the first-order parameter that determines the shape of the spatial window. For example, a spatial window with cardioid shape for $\alpha=0.5$ is obtained. A corresponding example spatial window with cardioid shape and look direction $\phi=45°$ is depicted in FIG. 4. For $\alpha=1$, no spatial window would be applied and only the distance weighting $G_j(p)$ would be effective. The distance weighting $G_j(p)$ emphasizes the spatial sound depending on the distance between the desired listening position and the j-th virtual loudspeaker. The weighting $G_j(p)$ can be computed for example as $$G_j(p) = (\|n_j - p\|)^{-\beta}$$

where p=[x, y, z] is the desired listening position in Cartesian coordinates. A drawing of the considered coordinate system is depicted in FIG. 5, where $\mathcal{O}$ is the reference position and $\mathcal{L}$ is the desired listening position with p being the corresponding listening position vector. The virtual loudspeakers are located on the solid circle and the black dot represents an example virtual loudspeaker. The term inside the round brackets in the above equation is the distance between the desired listening position and the j-th virtual loudspeaker position. The factor $\beta$ is the distance attenuation coefficient. For example for $\beta=0.5$, one would amplify the power corresponding to the j-th virtual loudspeaker inversely to the distance between the desired listening position and the virtual loudspeaker position. This mimics the effect of increasing loudness when approaching sound sources or spatial regions which are represented by the virtual loudspeakers.

In general, the spatial window $W(\varphi_j, \vartheta_j, p, 1)$ can be defined arbitrarily. In applications such as an acoustic zoom, the spatial window may be defined as an rectangular window centered towards the zoom direction, which becomes more narrow when zooming in and more broad when zooming out. The window width can be defined consistent to the zoomed video image such that the window attenuates sound sources at the side when the corresponding audio object disappears from the zoomed video image.

Clearly, the filtered virtual loudspeaker signals in this embodiment can be computed from the virtual loudspeaker signals with a single element-wise vector multiplication, i.e., $$s'(k, n) = w(p, 1)\circ s(k, n)$$

where $\circ$ is the element-wise product (Schur product) and $$w(p, l) = [W(\varphi_1, \vartheta_2, p, l), \ldots, W(\varphi_j, \vartheta_j, p, l), \ldots, W(\varphi_J, \vartheta_J, p, l)]^T$$

are the window weights for the J virtual loudspeakers given the desired listening position and orientation. The J filtered virtual microphone signals are collected in the vector $$s'(k, n) = [S'(\varphi_1, \vartheta_1), S'(\varphi_2, \vartheta_2), \ldots, S'(\varphi_j, \vartheta_j), \ldots, S'(\varphi_J, \vartheta_J)]^T$$

Embodiment 3: Position Modification (1040)

The purpose of the position modification (1040) is to compute the virtual loudspeaker positions from the point-of-view (POV) of the desired listening position with the desired listening orientation.

Figure 6:
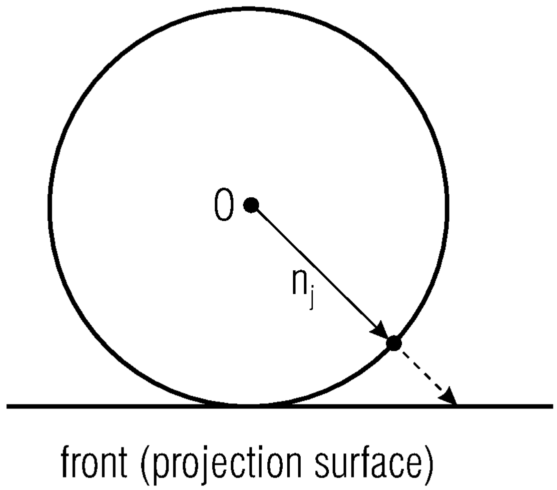
FIG. 6 illustrates a standard projection of a 360° video image and corresponding audio listening position for a consistent audio or video rendering.

An example is visualized in FIG. 6, which shows the top view of a spatial scene. Without loss of generality, it is assumed that the reference position corresponds to the center of the coordinate system, which is indicated by $\mathcal{O}$. Moreover, the reference orientation is towards the front, i.e., zero-degree azimuth and zero-degree elevation ($\varphi=0$ and $\vartheta=0$). The solid circle around $\mathcal{O}$ represents the sphere where the virtual loudspeakers are located. As an example, the figure shows a possible position vector $n_j$ of the j-th virtual loudspeaker.

In FIG. 7, the desired listening position is indicated by $\mathcal{L}$. The vector between the reference position $\mathcal{O}$ and desired listening position $\mathcal{L}$ is given by p (c.f. Embodiment 2a). As can be seen, the position of the j-th virtual loudspeaker from POV of the desired listening position can be represented by the vector $$n'_j = n_j - p$$

If the desired listening rotation is different from the reference rotation, an additional rotation matrix can be applied when computing the modified virtual loudspeaker positions, i.e., $$n'_j = (n_j - p)R$$

For example, if the desired listening orientation (relative to the reference orientation) corresponds to an azimuth angle $\phi$, the rotation matrix can be computed as [RotMat]

$$R = \begin{bmatrix} \cos\phi & -\sin\phi & 0 \\ \sin\phi & \cos\phi & 0 \\ 0 & 0 & 1 \end{bmatrix}$$

The modified virtual loudspeaker positions $n'_j$ are then used in the second spatial transform (1050). The modified virtual loudspeaker positions can also be expressed in terms of modified azimuth angles $\varphi'_j$ and modified elevation angles $\vartheta'_j$, i.e., $$n'_j = \begin{bmatrix} \cos\varphi'_j \cos\vartheta'_j \\ \sin\varphi'_j \cos\vartheta'_j \\ \sin\vartheta'_j \end{bmatrix}$$

As an example, the position modification described in this embodiment can be used to achieve consistent audio/video reproduction when using different projections of a spherical video image. The different projections or viewing positions for a spherical video can be for example selected by a user via a user interface of a video player. In such an application, FIG. 6 represents the top view of the standard projection of a spherical video. In this case, the circle indicates the pixel positions of the spherical video and the horizontal line indicates the two-dimensional video display (projection surface). The projected video image (display image) is found by projecting the spherical video from projection point, which results in the dashed arrow for the example image pixel. Here, the projection point corresponds to the center of the sphere $\mathcal{O}$. When using the standard projection, the corresponding consistent spatial audio image can be created by placing the desired (virtual) listening position in $\mathcal{O}$, i.e., in the center of the circle depicted in FIG. 6. Moreover, the virtual loudspeakers are located on the surface of the sphere, i.e., along the depicted circle, as discussed above. This corresponds to the standard spatial sound reproduction where the desired listening position is located in the sweet spot of the virtual loudspeakers.

Figure 7A:
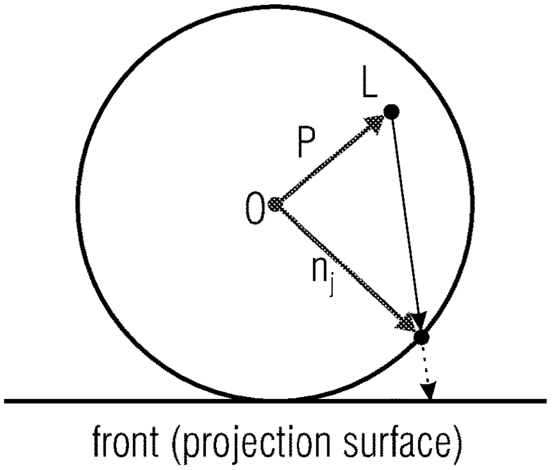
FIG. 7*a* depicts a modified projection of a 360° video image and corresponding modified audio listening position for a consistent audio/video rendering.
Figure 7B:
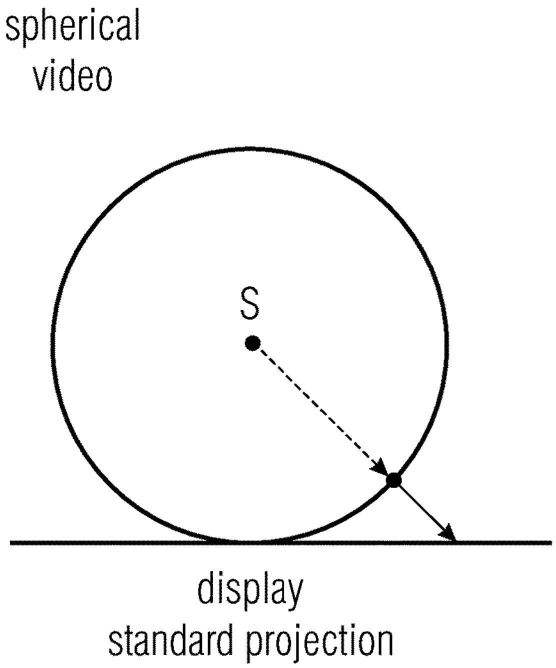
FIG. 7*b* illustrates a video projection in a standard projection case.

FIG. 7*a* represents the top view when considering the so-called little planet projection, which represents a common projection for rendering 360° videos. In this case, the projection point, from which the spherical video is projected, is located at position £ at the back of the sphere instead of the origin. As can be seen, this results in a shifted pixel position on the projection surface. When using the little planet projection, the correct (consistent) audio image is created by placing the listening position at position £ at the back of the sphere, while the virtual loudspeaker positions remain on the surface of the sphere. This means that the modified virtual loudspeaker positions are computed relative to the listening position £ as described above. A smooth transition between different projections (in both, the video and audio) can be achieved by changing the length of the vector p in FIG. 7*a*.

As another example, the position modification in this embodiment also can be used to create an acoustic zoom effect that mimics a visual zoom. To mimic a visual zoom, one can move the virtual loudspeaker position towards the zoom direction. In this case, the virtual loudspeaker in zoom direction will get closer whereas the virtual loudspeakers at the side (relative to the zoom direction) will move outwards, similarly as the video objects would move in a zoomed video image.

Subsequently, reference is made to FIG. 7*b* and FIG. 7*c*. Generally, the spatial transformation is applied for example to align the spatial audio image to different projections of a corresponding such as 360° video image. FIG. 7*b* illustrates the top view of a standard projection of a spherical video. The circle indicates the spherical video and the horizontal line indicates the video display or projection surface. The rotation of the spherical image relative to the video display is the projection orientation (not depicted), which can be set arbitrarily for a spherical video. The display image is found by projecting the spherical video from projection point S as indicated by the solid arrow. Here, the projection point S corresponds to the center of the sphere. When using the standard projection, the corresponding spatial audio image can be created by placing the (virtual) listening reference position in S, i.e., in the center of the circle depicted in FIG. 7*b*.

Moreover, the virtual loudspeakers are located on the surface of the sphere, i.e., along the depicted circle. This corresponds to the standard spatial sound reproduction where the listening reference position is located in the sweet spot, for example in the center of the sphere of FIG. 7*b*.

Figure 7C:
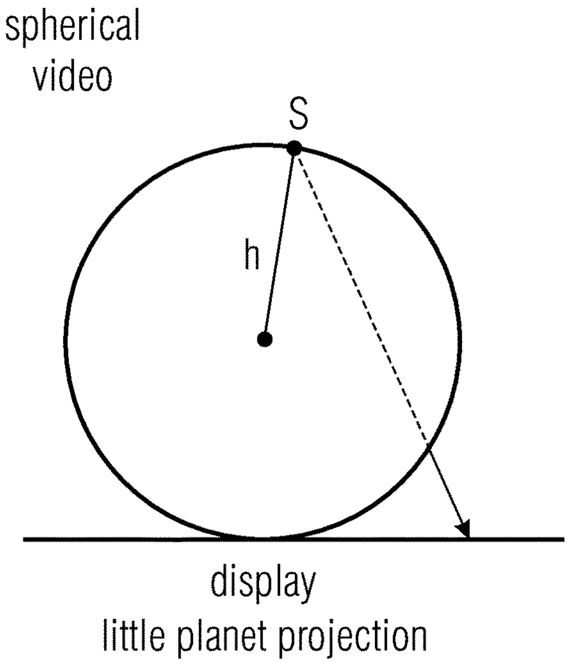
FIG. 7*c* illustrates a video projection in a little planet projection case.

FIG. 7*c* illustrates the top view of the little planet projection. In this case, the projection point S, from which the spherical video is projected, is located at the back of the sphere instead of the origin. When using the little planet projection, the correct audio image is created by placing the listening reference position at position S at the back of the sphere, while the virtual loudspeaker positions remain on the surface of the sphere. This means that the modified virtual loudspeaker positions are computed relative to the listening reference position S, which depends on the projection. A smooth transition between different projections can be achieved by changing the height h in FIG. 7*c*, i.e., by moving the projection point (or listening reference position, respectively) S along the vertical solid line. Thus, a listening position S that is different from the center of the circle in FIG. 7*c* is the target listening position and a look direction being different from the look direction to the display in FIG. 7*c* is a target listening orientation. To create the spatially transformed audio data, the spherical harmonics are, for example, calculated for the modified virtual loudspeaker positions instead of the original virtual loudspeaker positions. The modified virtual loudspeaker positions are found by moving the listening reference position S as illustrated, for example, in FIG. 7*c* or, according to the video projection.

Figure 13A:
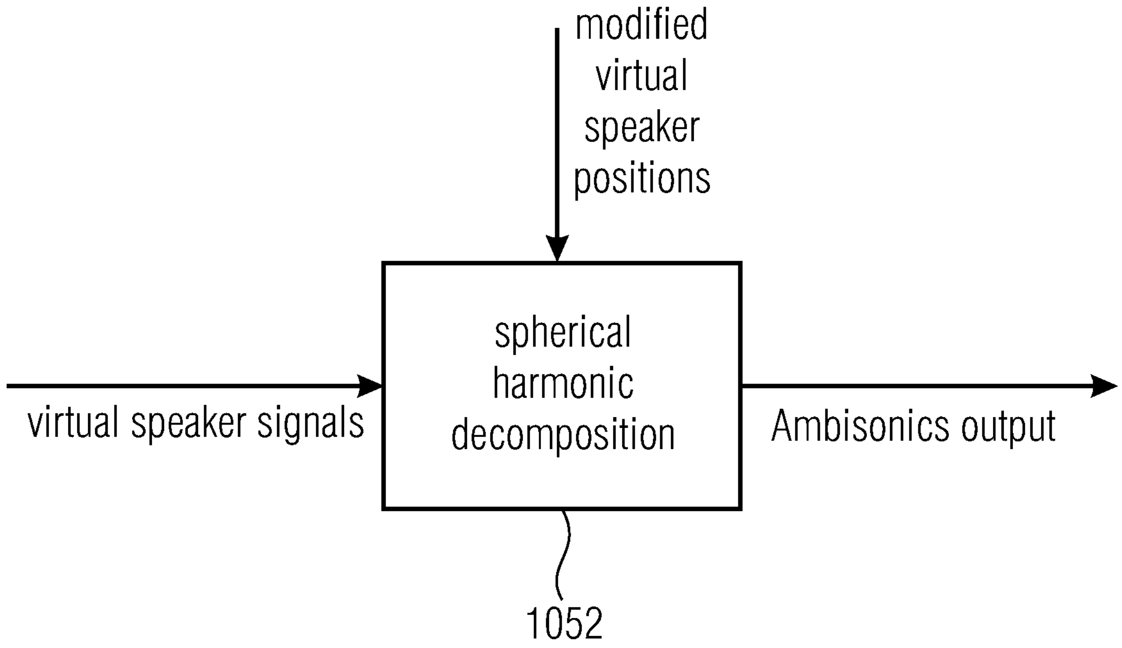
FIG. 13*a* illustrates an implementation of the (inverse) spatial transform to obtain an Ambisonics output.

Embodiment 4a: Second Spatial Transform (1050) for Ambisonics Output (FIG. 13*a*)

This embodiment describes an implementation of the second spatial transform (1050) to compute the audio output signals in the Ambisonics domain.

To compute the desired output signals, one can transform the (filtered) virtual loudspeaker signals $S'(\varphi_j, \vartheta_j)$ using a spherical harmonic decomposition (SHD) 1052, which is computed as the weighted sum over all J virtual loudspeaker signals according to [FourierAcoust]

$$A'_{l,m}(k,n) = \sum_{j=1}^{J} S'(\varphi_j, \vartheta_j) Y^*_{l,m}(\varphi'_j, \vartheta'_j)$$

Here, $Y^*_{l,m}(\varphi'_j, \vartheta'_j)$ are the conjugate-complex spherical harmonics of level (order) l and mode m. The spherical harmonics are evaluated at the modified virtual loudspeaker positions $(\varphi'_j, \vartheta'_j)$ instead of the original virtual loudspeaker positions. This assures that the audio output signals are created from the perspective of the desired listening position with the desired listening orientation. Clearly, the output signals $A'_{l,m}(k,n)$ can be computed up to an arbitrary user-defined level (order) L'.

The output signals in this embodiment also can be computed as a single matrix multiplication from the (filter) virtual loudspeaker signals, i.e., $$a'(k,n) = D(\varphi'_{1 \ldots J}, \vartheta'_{1 \ldots J}) s'(k,n)$$

where $$D(\varphi'_{1 \ldots J}, \vartheta'_{1 \ldots J}) = \begin{bmatrix} Y^*_{1,1}(\varphi'_1, \vartheta'_1) & \cdots & Y^*_{1,1}(\varphi'_J, \vartheta'_J) \\ \vdots & \ddots & \vdots \\ Y^*_{L',L'}(\varphi'_1, \vartheta'_1) & \cdots & Y^*_{L',L'}(\varphi'_J, \vartheta'_J) \end{bmatrix}$$

contains the spherical harmonics evaluated at the modified virtual loudspeaker positions and $$a'(k,n) = [A'_{0,0}(k,n), A'_{1,-1}(k,n), \ldots, A'_{l,m}(k,n), \ldots, A'_{L',L'}(k,n)]^T$$

contains the output signals up to the desired Ambisonics level (order) E.

Figure 13B:
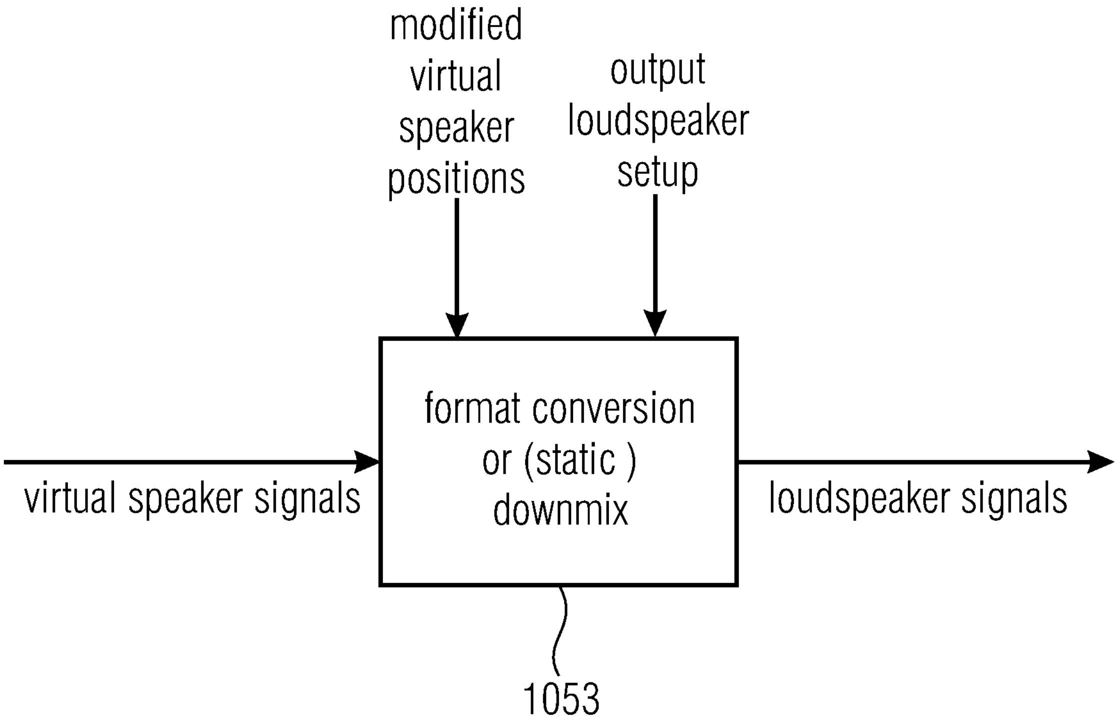
FIG. 13*b* illustrates an implementation of the (inverse) spatial transform for obtaining loudspeaker output signals.

Embodiment 4b: Second Spatial Transform (1050) for Loudspeaker Output (FIG. 13*b*)

This embodiment describes an implementation of the second spatial transform (1050) to compute the audio output signals in the loudspeaker domain. In this case, it is advantageous to convert the J (filtered) signals $S'(\varphi_j, \vartheta_j)$ of the virtual loudspeakers into loudspeaker signals of the desired output loudspeaker setup by taking into account the modified virtual loudspeaker positions $(\varphi'_j, \vartheta'_j)$. In general, the desired output loudspeaker setup can be defined arbitrary. Commonly used output loudspeaker setups are for example 2.0 (stereo), 5.1, 7.1, 11.1, or 22.2. In the following, the number of output loudspeakers is denoted by L and the positions of the output loudspeakers are given by the angles $(\varphi_l^{out}, \vartheta_l^{out})$.

To convert 1053 the (filtered) virtual loudspeaker signals into the desired loudspeaker format, it is advantageous to use the same approach as in Embodiment 1 b, i.e., one applies a static loudspeaker conversion matrix. In this case, the desired output loudspeaker signals are computed with $$a'(k,n) = C(\varphi'_{1 \ldots J}, \vartheta'_{1 \ldots J}, \varphi^{out}_{1 \ldots L}, \vartheta^{out}_{1 \ldots L}) s'(k,n)$$

where s'(k,n) contains the (filtered) virtual loudspeaker signals, a'(k,n) contains the L output loudspeaker signals, and C is the format conversion matrix. The format conversation matrix is computed using the angles $(\varphi_l^{out}, \vartheta_l^{out})$ of the output loudspeaker setup as well as the modified virtual loudspeaker positions $(\varphi'_j, \vartheta'_j)$. This assures that the audio output signals are created from the perspective of the desired listening position with the desired listening orientation. The conversation matrix C can be computed as explained in [FormatConv] by using for example the VBAP panning scheme [Vbap].

Figure 13C:
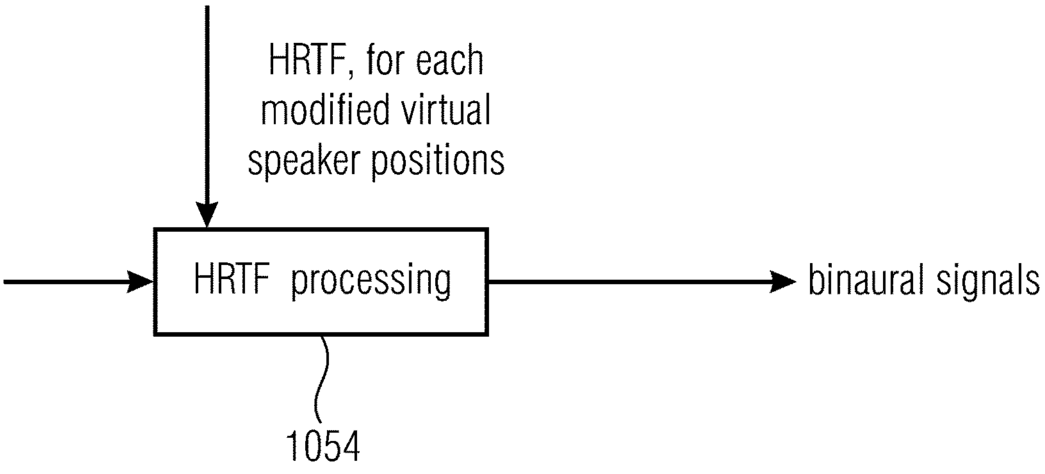
FIG. 13*c* illustrates an implementation of the (inverse) spatial transform for obtaining a binaural output.
Figure 13D:
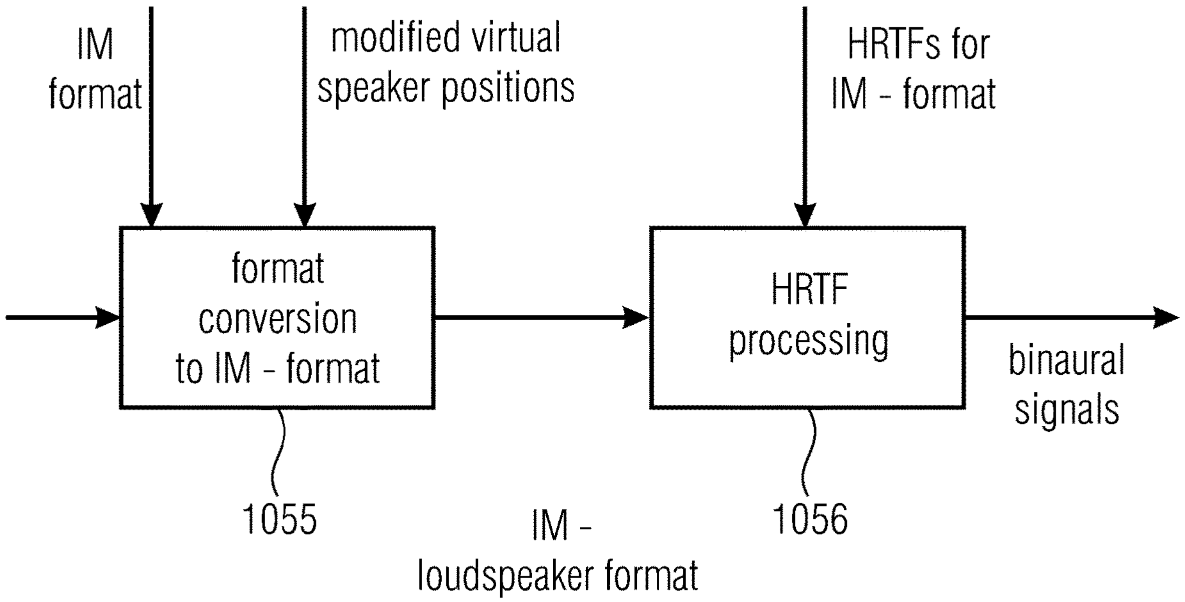
FIG. 13*d* illustrates an implementation of the (inverse) spatial transform for obtaining binaural signals in an alternative to FIG. 13*c;*

Embodiment 4c: Second Spatial Transform (1050) for Binaural Output (FIG. 13*c* or FIG. 13*d*)

The second spatial transform (1050) can create output signals in the binaural domain for binaural sound reproduction. One way is to multiply 1054 the J (filtered) virtual loudspeaker signals $S'(\varphi_j, \vartheta_j)$ with a corresponding head-related transfer function (HRTF) and to sum up the resulting signals, i.e., $$A'_{left}(k,n) = \sum_{j=1}^{J} S'(\varphi_j, \vartheta_j) H_{left}(k, \varphi'_j, \vartheta'_j)$$

$$A'_{right}(k,n) = \sum_{j=1}^{J} S'(\varphi_j, \vartheta_j) H_{right}(k, \varphi'_j, \vartheta'_j)$$

Here, $A'_{left}(k, n)$ and $A'_{right}(k, n)$ are the binaural output signals for the left and right ear, respectively, and $H_{left}(k, \varphi'_j, \vartheta'_j)$ and $H_{right}(k, \varphi'_j, \vartheta'_j)$ are the corresponding HRTFs for the j-th virtual loudspeaker. It is noted that the HRTFs for the modified virtual loudspeaker directions $(\varphi'_j, \vartheta'_j)$ are used. This assures that the binaural output signals are created from the perspective of the desired listening position with the desired listening orientation.

An alternative way to create binaural output signals is to perform a first or forward transform 1055 the virtual loudspeaker signals into the loudspeaker domain as described in Embodiment 4b, such as an intermediate loudspeaker format. Afterwards, the loudspeaker output signals from the intermediated loudspeaker format can be binauralized by applying 1056 the HRTFTs for the left and right ear corresponding to the positions of the output loudspeaker setup.

The binaural output signals also can be computed applying a matrix multiplication to the (filtered) virtual loudspeaker signals, i.e., $$a'(k,n) = D(k, \varphi'_{1 \ldots J}, \vartheta'_{1 \ldots J}) s'(k,n)$$

where $$D(k, \varphi'_{1 \ldots J}, \vartheta'_{1 \ldots J}) = \begin{bmatrix} H_{left}(k, \varphi'_1, \vartheta'_1) & \cdots & H_{left}(k, \varphi'_J, \vartheta'_J) \\ H_{right}(k, \varphi'_1, \vartheta'_1) & \cdots & H_{right}(k, \varphi'_J, \vartheta'_J) \end{bmatrix}$$

contains the HRTFs for the J modified virtual loudspeaker positions for the left and right ear, respectively, and the vector $$a'(k, n) = \left[A'_{left}(k, n), A'_{right}(k, n)\right]^T$$

contains the two binaural audio signals.

Embodiment 5: Embodiments Using a Matrix Multiplication

From the previous embodiments it is clear that the output signals a' (k,n) can be computed from the input signals a(k,n) by applying a single matrix multiplication, i.e., $$a'(k, n) = T(\varphi'_{1 \ldots J}, \vartheta'_{1 \ldots J})a(k, n)$$

where the transformation matrix $T(\varphi'_{1 \ldots J}, \vartheta'_{1 \ldots J})$ can be computed as $$T(\varphi'_{1 \ldots J}, \vartheta'_{1 \ldots J}) = D(\varphi'_{1 \ldots J}, \vartheta'_{1 \ldots J})\mathrm{diag}\{w(p, l)\}C(\varphi_{1 \ldots J}, \vartheta_{1 \ldots J})$$

Here, $C(\varphi_{1 \ldots J}, \vartheta_{1 \ldots J})$ is the matrix for the first spatial transform that can be computed as described in the Embodiments 1(a-d), w(p, l) is the optional spatial filter described in Embodiment 2, diag{•} denotes an operator that transforms a vector into a diagonal matrix with the vector being the main diagonal, and $D(\varphi'_{1 \ldots J}, \vartheta'_{1 \ldots J})$ is the matrix for the second spatial transform depending on the desired listening position and orientation, which can be computed as described in the Embodiments 4(a-c). In an embodiment, it is possible to precompute the matrix $T(\varphi'_{1 \ldots J}, \vartheta'_{1 \ldots J})$ for the desired listening positions and orientations (e.g., for a discrete grid of positions and orientations) to save computational complexity. In case of audio object input with time-varying positions, only the time-invariant parts of above calculation of $T(\varphi'_{1 \ldots J}, \vartheta_{1 \ldots J})$ may be precomputed to save computational complexity.

Subsequently, an implementation of the sound field processing as performed by the sound field processor 1000 is illustrated. In step 901 or 1010, two or more audio input signals are received in the time domain or time-frequency domain where, in the case of a reception of the signal in the time-frequency domain, an analysis filterbank has been used in order to obtain the time-frequency representation.

In step 1020, a first spatial transform is performed to obtain a set of virtual loudspeaker signals. In step 1030, an optional spatial filtering is performed by applying a spatial filter to the virtual loudspeaker signals. In case of not applying the step 1030 in FIG. 14, any spatial filtering is not performed, and the modification of the positions of the virtual loudspeakers depending on the listening position and orientation, i.e., depending on the target listening position and/or target orientation is performed as indicated e.g. in 1040*b*. In step 1050, a second spatial transform is performed depending on the modified virtual loudspeaker positions to obtain the audio output signals. In step 1060, an optional application of a synthesis filterbank is performed to obtain the output signals in the time domain.

Figure 14:
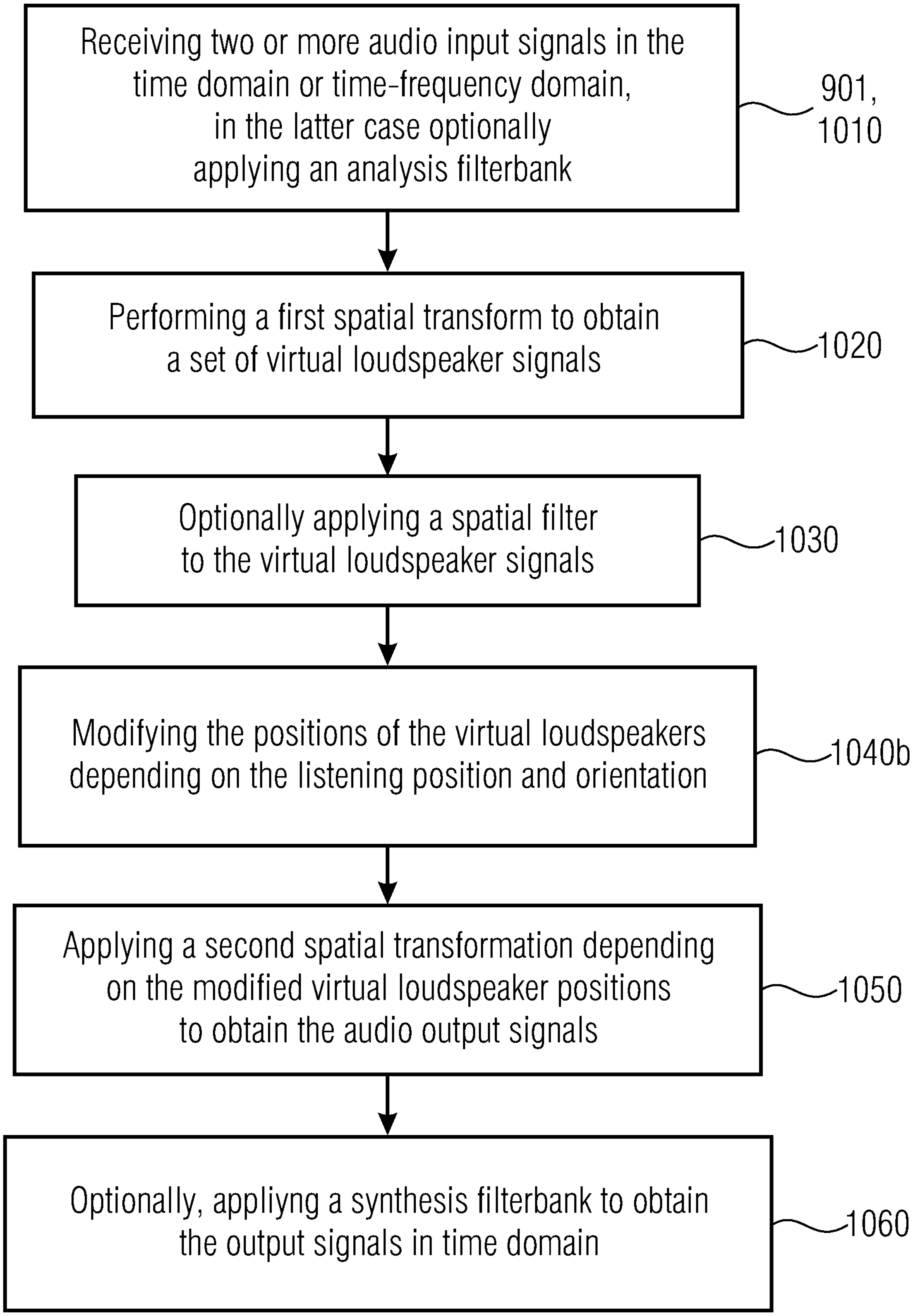
FIG. 14 illustrates a flowchart for a method or an apparatus for processing a sound field representation with an explicit calculation of the virtual loudspeaker signals.

Thus, FIG. 14 illustrates an explicit calculation of the virtual speaker signals, an optional explicit filtering of the virtual speaker signals and an optional handling of the virtual speaker signals or the filtered virtual speaker signals for the calculation of the audio output signals of the processed sound field representation.

Figure 15:
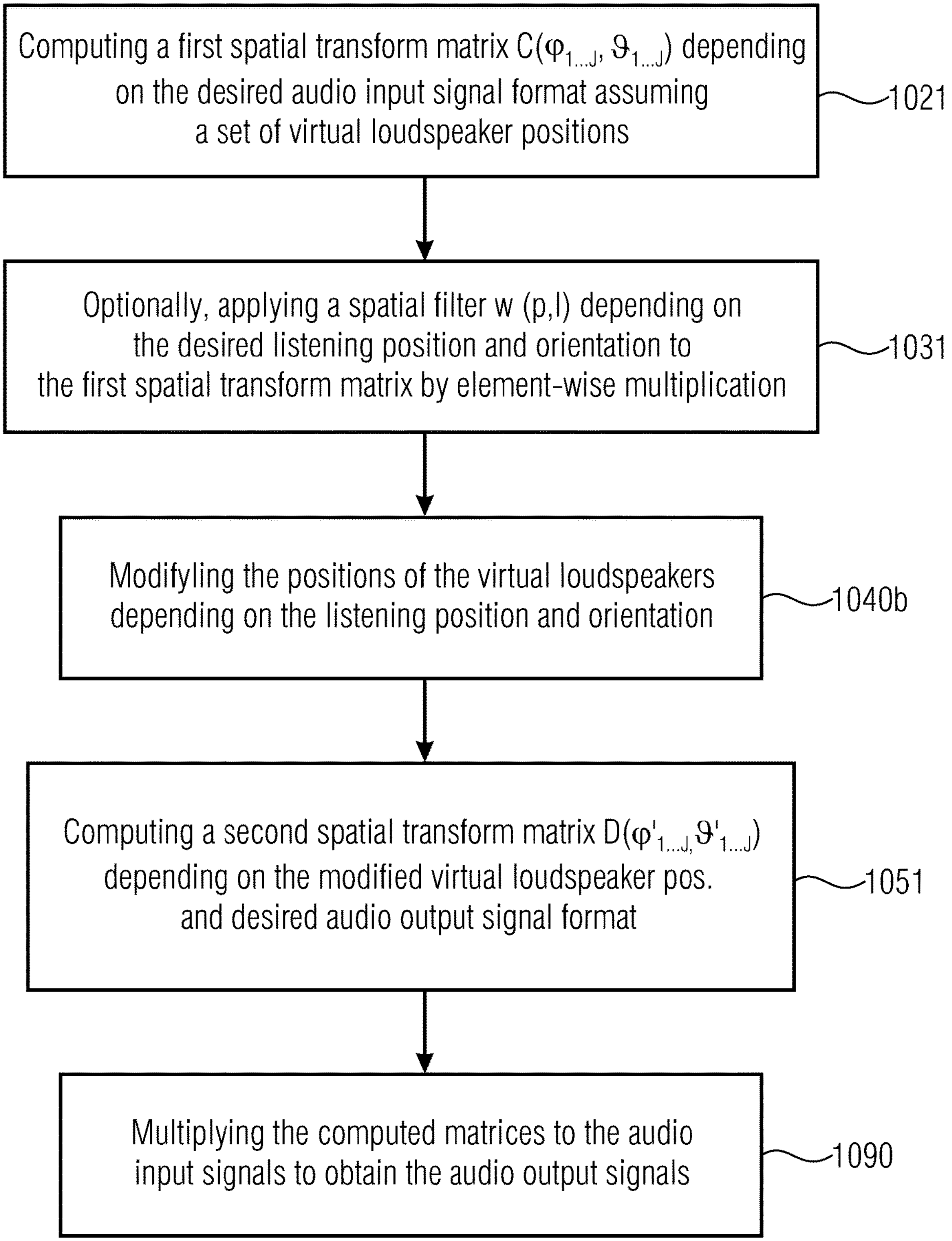
FIG. 15 illustrates a flowchart for an embodiment of a method or an apparatus for processing a sound field representation without explicit calculation of the virtual loudspeaker signals.

FIG. 15 illustrates another embodiment where a first spatial transform rule such as the first spatial transform matrix is computed depending on the desired audio input signal format where a set of virtual loudspeaker positions is assumed as illustrated at 1021. In step 1031, an optional application of a spatial filter is accounted for which depends on the desired listening position and/or orientation, and a spatial filter is, for example, applied to the first spatial transform matrix by an element-wise multiplication without any explicit calculation and handling of virtual speaker signals. In step 1040*b*, the positions of the virtual speakers are modified depending on the listening position and/or orientation, i.e., depending on the target position and/or orientation. In step 1051, a second spatial transform matrix or generally, a second or backward spatial transform rule is calculated depending on the modified virtual speaker positions and the desired audio output signal format. In step 1090, the computed matrices in blocks 1031, 1021 and 1051 can be combined to each other and are then multiplied to the audio input signals in the form of a single matrix. Alternatively, the individual matrices can be individually applied to the corresponding data or at least two matrices can be combined to each other to obtain a combined transformation definition as has been discussed with respect to the individual four cases illustrated with respect to FIG. 10*a* to FIG. 10*d*.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

Depending on certain implementation requirements, embodiments of the invention can be implemented in hardware or in software. The implementation can be performed using a digital storage medium, for example a floppy disk, a DVD, a CD, a ROM, a PROM, an EPROM, an EEPROM or a FLASH memory, having electronically readable control signals stored thereon, which cooperate (or are capable of cooperating) with a programmable computer system such that the respective method is performed.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier or a non-transitory storage medium.

In other words, an embodiment of the inventive method is, therefore, a computer program having a program code for performing one of the methods described herein, when the computer program runs on a computer.

A further embodiment of the inventive methods is, therefore, a data carrier (or a digital storage medium, or a computer-readable medium) comprising, recorded thereon, the computer program for performing one of the methods described herein.

A further embodiment of the inventive method is, therefore, a data stream or a sequence of signals representing the computer program for performing one of the methods described herein. The data stream or the sequence of signals may for example be configured to be transferred via a data communication connection, for example via the Internet.

A further embodiment comprises a processing means, for example a computer, or a programmable logic device, configured to or adapted to perform one of the methods described herein.

A further embodiment comprises a computer having installed thereon the computer program for performing one of the methods described herein.

In some embodiments, a programmable logic device (for example a field programmable gate array) may be used to perform some or all of the functionalities of the methods described herein. In some embodiments, a field programmable gate array may cooperate with a microprocessor in order to perform one of the methods described herein. Generally, the methods are advantageously performed by any hardware apparatus.

The above described embodiments are merely illustrative for the principles of the present invention. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

REFERENCES

[AmbiTrans] Kronlachner and Zotter, "Spatial transformations for the enhancement of Ambisonics recordings", ICSA 2014

[FormatConv] M. M. Goodwin and J.-M. Jot, "Multichannel surround format conversion and generalized upmix", AES 30th International Conference, 2007

[FourierAcoust] E. G. Williams, "Fourier Acoustics: Sound Radiation and Nearfield Acoustical Holography," Academic Press, 1999.

[WolframProj1] http://mathworld.wolfram.com/StereographicProjection.html

[WolframProj2] http://mathworld.wolfram.com/GnomonicProjection.html

[RotMat] http://mathworld.wolfram.com/RotationMatrix.html

[Vbap] V. Pulkki, "Virtual Sound Source Positioning Using Vector Base Amplitude Panning", J. Audio Eng. Soc, Vol. 45 (6), 1997

[VirtualMic] O. Thiergart, G. Del Galdo, M. Taseska, E.A.P. Habets, "Geometry-based Spatial Sound Acquisition Using Distributed Microphone Arrays", Audio, Speech, and Language Processing, IEEE Transactions on, Vol. 21 (12), 2013

The invention claimed is:

1. An apparatus for processing a sound field representation related to a defined reference point or a defined listening orientation for the sound field representation, comprising:

a sound field processor for processing the sound field representation using a deviation of a target listening position from the defined reference point or of a target listening orientation from the defined listening orientation, to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the sound field processor is configured to process the sound field representation so that the deviation or the spatial filter is applied to the sound field representation in relation to a spatial transform domain having associated therewith a forward transform rule and a backward transform rule, wherein the sound field processor is configured to calculate the forward transform rule using virtual positions of virtual speakers related to the defined reference point or the defined listening orientation, to calculate the backward transform rule using modified virtual position of the virtual speakers related to the target listening position or the target listening orientation, to combine the forward transform rule and the backward transform rule to acquire the transformation definition, and to apply the transformation definition to the sound field representation, or wherein the sound field processor is configured to calculate the forward transform rule using virtual positions of virtual speakers related to the defined reference point or the defined listening orientation, to calculate the spatial filter, to calculate the backward transform rule using the same or modified virtual positions, to combine the forward transform rule, the spatial filter and the backward transform rule to acquire another transformation definition and to apply the another transformation definition to the sound field representation, or wherein the sound field processor is configured to calculate the backwards transform rule using modified virtual positions of virtual speakers, to calculate the modified virtual positions of the virtual speakers for each virtual speaker using an original position vector from the defined reference point to the virtual position, a deviation vector derived from the target listening position or the target listening orientation, and/or a rotation matrix indicating a target rotation being different from the pre-defined rotation, to acquire an updated position vector, and to use the updated position vector for the backward transform rule for an associated virtual speaker.

2. The apparatus of claim 1, further comprising a detector for detecting the deviation of the target listening position from the defined reference point or for detecting the deviation of the target listening orientation from the defined listening orientation or for detecting the target listening position and for determining the deviation of the target listening position from the defined reference point or for detecting the target listening orientation and for determining the deviation of the target listening orientation from the defined listening orientation.

3. The apparatus according to claim 2, wherein the detector is configured to detect the deviation as a vector comprising a direction and a length, and wherein the vector represents a linear transition from the defined reference point to the target listening position.

4. The apparatus according to claim 2, wherein the sound field representation is associated with a three dimensional video or spherical video and the defined reference point is a center of the three dimensional video or the spherical video, wherein the detector is configured to detect a user input indicating an actual viewing point being different from the center, the actual viewing point being identical to the target listening position, and wherein the detector is configured to derive the detected deviation from the user input, or wherein the detector is configured to detect another user input indicating an actual viewing orientation being different from the defined listening orientation directed to the center, the actual viewing orientation being identical to the target listening orientation, and wherein the detector is configured to derive the detected deviation from the another user input.

5. The apparatus of claim 1, wherein the sound field representation comprises a plurality of audio signals in an audio signal domain different from the spatial transform domain, wherein the sound field processor is configured to generate the processed sound field description in the audio signal domain different from the spatial transform domain.

6. The apparatus according to claim 1, wherein the sound field processor is configured to process the sound field representation using the forward transform rule for the spatial transform, the forward transform rule being related to a set of virtual speakers at a set of virtual positions of the virtual speakers, using the spatial filter within the spatial transform domain, and using the backward transform rule for the spatial transform using the set of the virtual positions of the virtual speakers, or wherein the sound field processor is configured to process the sound field representation using the forward transform rule for the spatial transform, the forward transform rule being related to a set of virtual speakers at a set of the virtual positions of the virtual speakers, and using the backward transform rule for the spatial transform using a set of modified virtual positions of the virtual speakers derived from the set of the virtual positions of the virtual speakers using the deviation, or wherein the sound field processor is configured to process the sound field representation using the forward transform rule for the spatial transform, the forward transform rule being related to a set of virtual speakers at a set of virtual positions of the virtual speakers, using the spatial filter within the spatial transform domain; and using the backward transform rule for the spatial transform using a set of modified virtual positions of the virtual speakers derived from the set of virtual positions of the virtual speakers using the deviation.

7. The apparatus according to claim 6, wherein the set of the virtual positions of the virtual speakers is associated with the defined listening orientation, and wherein the set of the modified virtual positions of the virtual speakers is associated with the target listening orientation, and wherein the target listening orientation is calculated from the detected deviation and the defined listening orientation.

8. The apparatus according to claim 6, wherein the set of the virtual positions of the virtual speakers is associated with the defined listening position and the defined listening orientation, wherein the defined listening position corresponds to a first projection point and projection orientation of an associated video resulting in a first projection of the associated video on a display area representing a projection surface, and wherein the set of the modified virtual positions of the virtual speakers is associated with a second projection point and a second projection orientation of the associated video resulting in a second projection of the associated video on the display area corresponding to the projection surface.

9. The apparatus according to claim 1, wherein the sound field processor is configured to store, for each grid point of a grid of target listening positions or target listening orientations, a pre-calculated transformation definition or a transform rule, wherein the pre-calculated transformation definition represents at least two of the forward transform rule, the spatial filter and the backward transform rule, and wherein the sound field processor is configured to select the pre-calculated transformation definition or the transform rule for a grid point related to the target listening position or the target listening orientation and to apply the selected pre-calculated transformation definition or transform rule.

10. The apparatus according to claim 9, wherein the pre-calculated transformation definition is a transform matrix comprising a dimension of N rows and M columns, wherein N and M are integers greater than 2, and wherein the sound field representation comprises M audio signals, and wherein the processed sound field representation comprises N audio signals, or vice versa.

11. The apparatus according to claim 1, wherein the sound field processor is configured to forward transform the sound field representation from an audio signal domain into the spatial transform domain using the forward transform rule to acquire virtual speaker signals for virtual speakers at pre-defined virtual positions of the virtual speakers related to the defined reference point or the defined listening orientation, and to backward transform the virtual speaker signals into the audio signal domain using the backward transform rule based on the modified virtual positions of the virtual speakers related to the target listening position or the target listening orientation, or to apply the spatial filter to the virtual speaker signals to acquire filtered virtual speaker signals, and to backward transform the filtered virtual speaker signals using the backward transform rule based on the modified virtual positions of the virtual speakers related to the target listening positions or the target listening orientation or the virtual positions of the virtual speakers related to the defined reference position or listening orientation.

12. The apparatus according to claim 1, wherein the sound field processor is configured to calculate the forward transform rule and the spatial filter and to combine the forward transform rule and the spatial filter to acquire a partial transformation definition, to apply the partial transformation definition to the sound field representation to acquire filtered virtual speaker signals, and to backward transform the filtered virtual speaker signals using the backward transform rule based on the modified virtual positions of the virtual speakers related to the target listening position or the target listening orientation or based on the virtual positions of the virtual speakers related to the defined reference point or defined listening orientation, or wherein the sound field processor is configured to calculate the spatial filter and the backward transform rule based on the modified virtual positions of the virtual speakers related to the target listening position or the target listening orientation or the virtual positions of the virtual speakers related to the defined reference point or listening orientation, to combine the spatial filter and the backward transform rule to acquire a partial transformation definition, to forward transform the sound field representation from an audio signal domain into the spatial transform domain to acquire virtual speaker signals for virtual speakers at predefined virtual positions of the virtual speakers, and to apply the partial transformation definition to the virtual speaker signals.

13. The apparatus according to claim 1, wherein at least one of the forward transform rule, the spatial filter, the backward transform rule, the transformation definition, the another transformation definition, or a partial transformation definition or a pre-calculated transformation definition comprises a matrix, or wherein an audio signal domain is a time domain or a time-frequency domain.

14. The apparatus according to claim 1, wherein the sound field representation comprises a plurality of Ambisonics signals, and wherein the sound field processor is configured to calculate the forward transform rule using a plain wave decomposition and the virtual positions of the virtual speakers related to the defined listening position or the defined listening orientation, or wherein the sound field representation comprises a plurality of speaker channels for a defined speaker setup comprising a sweet spot, wherein the sweet spot represents the defined reference position, and wherein the sound field processor is configured to calculate the forward transform rule using an upmix rule or a downmix rule of the speaker channels into a virtual speaker setup comprising virtual speakers at the virtual positions related to the sweet spot, or wherein the sound field representation comprises a plurality of real or virtual microphone signals related to an array center as the defined reference position, and wherein the sound field processor is configured to calculate the forward transform rule as beamforming weights representing a beamforming operation for each virtual position of a virtual speaker of the virtual speakers on the plurality of microphone signals, or wherein the sound field representation comprises an audio object representation comprising a plurality of audio objects comprising associated position information, and wherein the sound field processor is configured to calculate the forward transform rule representing a panning operation for panning the audio objects to the virtual speakers at the virtual positions of the virtual speakers related to the defined reference position using the position information for the audio objects.

15. The apparatus according to claim 1, wherein the sound field processor is configured to calculate the spatial filter as a set of window coefficients depending on the virtual positions of the virtual speakers used in the forward transform rule and additionally depending on at least one of the defined reference position, the defined listening orientation, the target listening position, and the target listening orientation.

16. The apparatus according to claim 1, wherein the sound field processor is configured to calculate the spatial filter as a set of non-negative real valued gain values, so that a spatial sound is emphasized towards a look direction indicated by the target listening orientation, or wherein the sound field processor is configured to calculate the spatial filter as a spatial window.

17. The apparatus according to claim 1, wherein the sound field processor is configured to calculate the spatial filter as a common first-order spatial window directed towards a target look direction or as a common first-order spatial window being attenuated or amplified according to a distance between the target listening position and a corresponding virtual speaker position, or as a rectangular spatial window becoming narrower in case of a zooming-in operation or becoming broader in case of a zooming-out operation, or as a window that attenuates sound sources at a side when a corresponding audio object disappears from a zoomed video image.

18. The apparatus according to claim 1, wherein the processed sound field description comprises a plurality of Ambisonics signals, and wherein the sound field processor is configured to calculate the backwards transform rule using a harmonic decomposition representing a weighted sum over all virtual speaker signals evaluated at the modified speaker positions or related to the target listening orientation, or wherein the processed sound field description comprises a plurality of speaker channels for a defined output speaker setup, wherein the sound field processor is configured to calculate the backwards transform rule using a speaker format conversion matrix derived from the modified virtual positions of the virtual speakers or related to the target listening orientation using the position of the virtual speakers in the defined output speaker setup, or wherein the processed sound field description comprises a binaural output, wherein the sound field processor is configured to calculate the binaural output signals using head-related transfer functions associated with the modified virtual positions of the virtual speakers or using a speaker format conversion rule related to a defined intermediate output speaker setup and head-related transfer functions related to the defined output speaker setup.

19. The apparatus according to claim 1, wherein the apparatus comprises a memory comprising stored sets of pre-calculated coefficients associated with different predefined deviations, and wherein the sound field processor is configured to search, among the different predefined deviations, for the predefined deviation being closest to the detected deviation, to retrieve, from the memory, the pre-calculated set of coefficients associated with the closest predetermined deviation, and to forward the retrieved pre-calculated set of coefficients to the sound field processor.

20. The apparatus according to claim 1, wherein the sound field representation is associated with a three dimensional video or spherical video and the defined reference point is a center of the three dimensional video or the spherical video, wherein the sound field processor is configured to process the sound field representation so that the processed sound field representation represents a standard or little planet projection or a transition between the standard or the little planet projection of at least one sound object comprised by the sound field description with respect to a display area for the three dimensional video or the spherical video, the display area being defined by the user input and a defined viewing direction.

21. The apparatus according to claim 1, wherein the sound field processor is configured to convert the sound field description into a virtual speaker related representation associated with a first set of virtual positions of virtual speakers, wherein the first set of the virtual positions of the virtual speakers is associated with the defined reference point, transform the first set of virtual positions of the virtual speakers into a set of modified virtual positions of the virtual speakers, wherein the set of the modified virtual positions of the virtual speakers is associated with the target listening position, and convert the virtual speaker related representation into the processed sound field description associated with the set of the modified virtual positions of the virtual speakers, wherein the sound field processor is configured to calculate the set of the modified virtual positions of the virtual speakers using the detected deviation.

22. The apparatus according to claim 1, wherein the sound field processor comprises:

a time-spectrum converter for converting the sound field representation into a time-frequency domain representation.

23. The apparatus according to claim 1, wherein the sound field processor is configured for processing the sound field representation using the deviation and the spatial filter.

24. The apparatus according to claim 1, wherein the sound field representation is an Ambisonics signal comprising an input order, wherein the processed sound field description is an Ambisonics signal comprising an output order, and wherein the sound field processor is configured to calculate the processed sound field description so that the output order is equal to the input order.

25. The apparatus according to claim 1, wherein the sound field processor is configured to acquire a processing matrix associated with the deviation and to apply the processing matrix to the sound field representation, wherein the sound field representation comprises at least two sound field components, and wherein the processing matrix is a N×N matrix, where N is equal to two or is greater than two.

26. The apparatus according to claim 1, wherein the sound field processor is configured for processing the sound field representation so that a loudness of a sound object or a spatial region represented by the processed sound field description is greater than a loudness of the sound object or the spatial region represented by the sound field representation, when the target listening position is closer to the sound object or the spatial region than the defined reference point.

27. The apparatus according to claim 1, wherein the sound field processor is configured to determine, for each virtual speaker, a separate direction with respect to the defined reference point;

perform an inverse spherical harmonic decomposition with the sound field representation by evaluating spherical harmonic functions at the determined directions;

determine modified directions from the virtual positions of virtual speakers to the target listening position; and perform a spherical harmonic decomposition using the spherical harmonic functions evaluated at the modified virtual positions of virtual speakers.

28. A method of processing a sound field representation related to a defined reference point or a defined listening orientation for the sound field representation, comprising:

detecting a deviation of a target listening position from the defined reference point or of a target listening orientation from the defined listening orientation; and processing the sound field representation using the deviation to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the deviation or the spatial filter is applied to the sound field representation in relation to a spatial transform domain having associated therewith a forward transform rule and a backward transform rule, wherein the processing comprises calculating the forward transform rule using virtual positions of virtual speakers related to the defined reference point or the defined listening orientation, calculating the backward transform rule using the modified virtual position of the virtual speakers related to the target listening position or the target listening orientation, combining the forward transform rule and the backward transform rule to acquire a transformation definition, and applying the transformation definition to the sound field representation, or wherein the processing comprises calculating the forward transform rule using virtual positions of virtual speakers related to the defined reference point or the defined listening orientation, calculating the spatial filter, calculating the backward transform rule using the same or modified virtual positions, combining the forward transform rule, the spatial filter and the backward transform rule to acquire another transformation definition, and applying the another transformation definition to the sound field representation, or wherein the processing comprises calculating the backwards transform rule using modified virtual positions of virtual speakers, calculating the modified virtual positions of the virtual speakers for each virtual speaker using an original position vector from the defined reference point to the virtual position, a deviation vector derived from the target listening position or the target listening orientation, and/or a rotation matrix indicating a target rotation being different from the pre-defined rotation, to acquire an updated position vector, and using the updated position vector for the backward transform rule for an associated virtual speaker.

29. A non-transitory digital storage medium having a computer program stored thereon to perform the method of processing a sound field representation related to a defined reference point or a defined listening orientation for the sound field representation, comprising:

detecting a deviation of a target listening position from the defined reference point or of a target listening orientation from the defined listening orientation; and processing the sound field representation using the deviation to acquire a processed sound field description, wherein the processed sound field description, when rendered, provides an impression of the sound field representation at the target listening position being different from the defined reference point or for the target listening orientation being different from the defined listening orientation, or for processing the sound field representation using a spatial filter to acquire the processed sound field description, wherein the processed sound field description, when rendered, provides an impression of a spatially filtered sound field description, wherein the deviation or the spatial filter is applied to the sound field representation in relation to a spatial transform domain having associated therewith a forward transform rule and a backward transform rule, wherein the processing comprises calculating the forward transform rule using virtual positions of virtual speakers related to the defined reference point or the defined listening orientation, calculating the backward transform rule using the modified virtual position of the virtual speakers related to the target listening position or the target listening orientation, combining the forward transform rule and the backward transform rule to acquire a transformation definition, and applying the transformation definition to the sound field representation, or wherein the processing comprises calculating the forward transform rule using virtual positions of virtual speakers related to the defined reference point or the defined listening orientation, calculating the spatial filter, calculating the backward transform rule using the same or modified virtual positions, combining the forward transform rule, the spatial filter and the backward transform rule to acquire another transformation definition, and applying the another transformation definition to the sound field representation, or wherein the processing comprises calculating the backwards transform rule using modified virtual positions of virtual speakers, calculating the modified virtual positions of the virtual speakers for each virtual speaker using an original position vector from the defined reference point to the virtual position, a deviation vector derived from the target listening position or the target listening orientation, and/or a rotation matrix indicating a target rotation being different from the pre-defined rotation, to acquire an updated position vector, and using the updated position vector for the backward transform rule for an associated virtual speaker, when said computer program is run by a computer.

* * * * *